United States Patent [19]

Weihs et al.

[11] Patent Number: 5,670,183

[45] Date of Patent: Sep. 23, 1997

[54] DEVICE FOR THE PRODUCTION OF A JOINT CONNECTION

[75] Inventors: Hendrik Weihs, Riederich; Frank Kocian, Neckartailfingen; Richard Kochendoerfer, Stuttgart, all of Germany

[73] Assignee: Deutsche Forschungsanstalt fuer Luft- und Raumfahrt e.V., Bonn, Germany

[21] Appl. No.: 457,573

[22] Filed: Jun. 1, 1995

[30] Foreign Application Priority Data

Jun. 1, 1994 [DE] Germany ............................ 44 19 159.6

[51] Int. Cl.⁶ .............................. B29C 45/24; F16B 19/08
[52] U.S. Cl. ...................... 425/110; 264/39; 264/262; 264/263; 425/13; 425/225; 425/226
[58] Field of Search .................... 425/12, 13, 110, 425/225, 226, 546, 812; 264/39, 249, 263, 262, 273, 274

[56] References Cited

U.S. PATENT DOCUMENTS

| | | | |
|---|---|---|---|
| 3,108,404 | 10/1963 | Lamb | 425/110 |
| 3,185,749 | 5/1965 | Gitzinger et al. | 425/110 |
| 3,217,363 | 11/1965 | Rohe et al. | 425/110 |
| 3,510,916 | 5/1970 | Phelan | 425/110 |
| 3,571,857 | 3/1971 | Rhyne | 425/110 |
| 4,212,610 | 7/1980 | Weidlich et al. | 425/110 |
| 4,280,861 | 7/1981 | Schwartz | 425/13 |
| 4,478,544 | 10/1984 | Strand | 411/34 |
| 4,659,268 | 4/1987 | Del Mundo et al. | 411/34 |
| 4,687,396 | 8/1987 | Berecz | 264/32 |
| 5,073,224 | 12/1991 | Addison et al. | 425/13 |
| 5,209,935 | 5/1993 | Jacino et al. | 425/13 |
| 5,310,434 | 5/1994 | Vives et al. | 264/29.1 |
| 5,314,282 | 5/1994 | Murphy et al. | 411/426 |

FOREIGN PATENT DOCUMENTS

| | | |
|---|---|---|
| 35 17 652 | 9/1986 | Germany . |
| 36 40 484 | 6/1988 | Germany . |

*Primary Examiner*—James P. Mackey
*Attorney, Agent, or Firm*—Barry R. Lipsitz; Ralph F. Hoppin

[57] ABSTRACT

In order to provide a joint connection, comprising a first joining piece with a first contact surface and a passage opening onto the first contact surface, and a second joining piece with a second contact surface and a recess opening onto the second contact surface, said first joining piece and second joining piece standing in a joining position in relation to one another, in which the contact surfaces abut one another and the passage and the recess together form a cavity, for joining pieces made from brittle materials it is proposed that a positive-locking element is disposed in the cavity; that the positive-locking element comprises a plastically inserted molding, which is cured in the cavity and abuts the joining pieces over their surface; that together with the first joining piece and the second joining piece, the positive-locking element forms a positive locking which secures the first joining piece and the second joining piece relative to one another in at least one direction of stress along the contact surfaces; and that the positive-locking element has undercuts which together with the first joining piece and the second joining piece form a positive locking which secures the positive-locking element in the cavity.

12 Claims, 12 Drawing Sheets

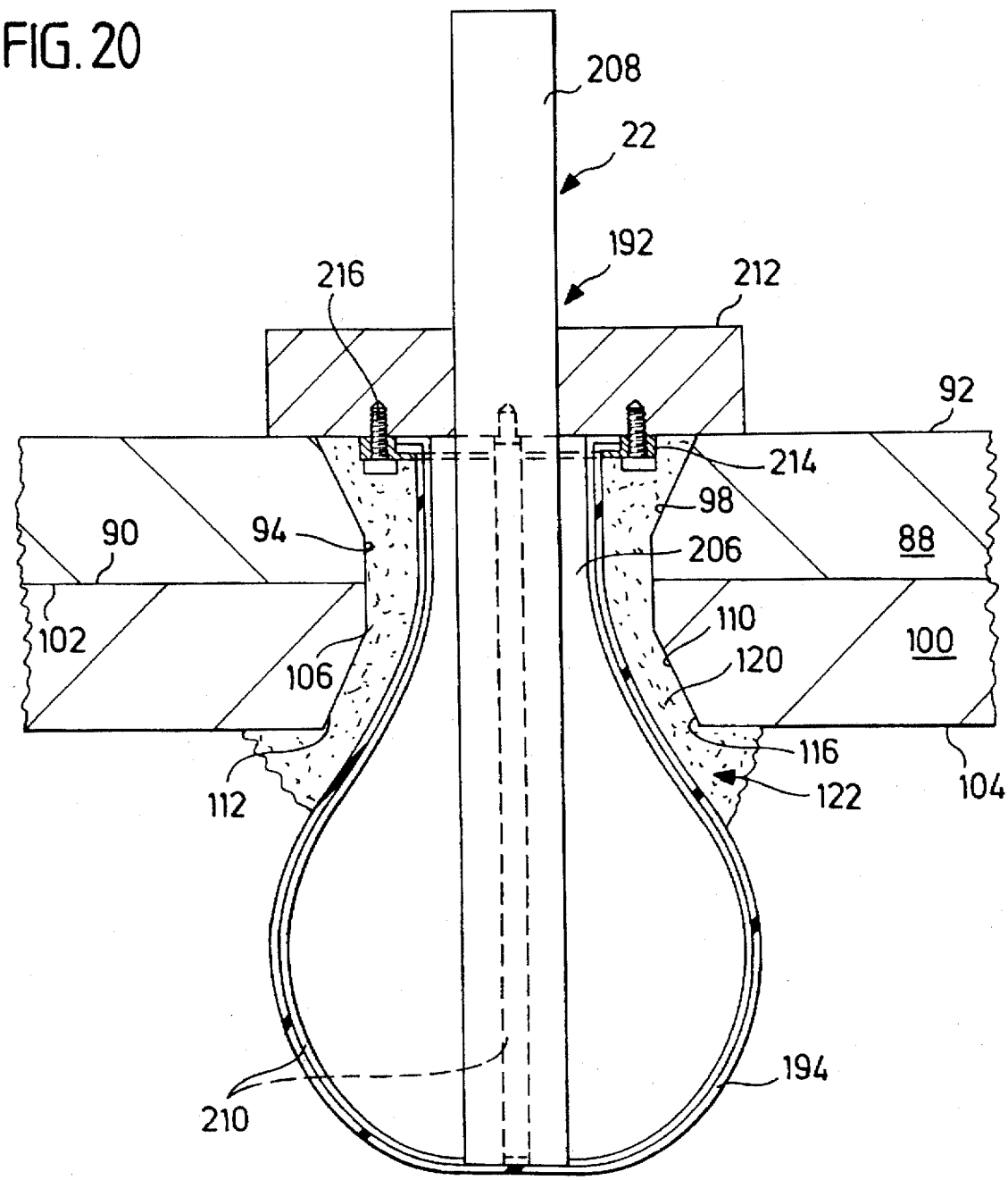

DEVICE FOR THE PRODUCTION OF A JOINT CONNECTION

BACKGROUND OF THE INVENTION

The present invention relates to a joint connection, comprising a first joining piece with a first contact surface and a passage opening onto the first contact surface, and a second joining piece with a second contact surface and a recess opening onto the second contact surface, said first joining piece and second joining piece standing in a joining position in relation to one another, in which the first contact surface and the second contact surface abut one another and the passage of the first joining piece and the recess of the second joining piece together form a cavity. The invention additionally relates to a process and device for the production of such a joint connection.

A substantial number of such joint connections are known in the form of riveted and bolted joints.

To produce a riveted joint, a rivet with a rivet head is inserted into the cavity (the rivet hole) and plastically deformed, whereby a second rivet hole is formed which prevents the rivet from falling out. Rivets are generally made from metal materials since such rivets have a high elastic and plastic ductility, as a result of which the tension peaks in the joint connection generated as a consequence of production irregularities are reduced.

However, the known riveted joints are not suitable for the production of joint connections between joining pieces made of materials with brittle fracture behavior. Such materials which exhibit practically no plastic deformation tend to break during the riveting process as a result of appreciable stresses of the joining pieces. Bolted joints are also generally unsuited to the production of such joint connections, since the tension peaks arising as a consequence of unavoidable production irregularities cannot be reduced because of the lacking plasticity of the joining pieces. Therefore, when the material strength is exceeded, a crack forms which immediately leads to total failure of the joint because of the brittle fracture behavior.

Similarly, for the specified reasons, materials with low plasticity cannot be used as rivet or bolt material. However, it is desirable in many applications to produce connecting elements made from similar materials to that of the joining pieces so that these connecting elements and the joining pieces have comparable physical and chemical properties and the range of usage of the joining pieces, e.g. at high temperatures or in chemically aggressive ambient conditions, is not restricted by lower resistance of the connecting elements.

Consequently, the object of the invention is to provide a joint connection of the generic type, which also allows joining pieces made from materials with brittle fracture behavior to be joined together when using connecting elements also made from brittle materials.

THE SUMMARY OF THE INVENTION

This object is achieved according to the invention in the case of a joint connection of the type described above in that a positive-locking element is disposed in the cavity; that the positive-locking element comprises a plastically inserted molding, which is cured in the cavity and abuts the joining pieces over their surface; that together with the first joining piece and the second joining piece, the positive-locking element forms a positive locking which secures the first joining piece and the second joining piece relative to one another in at least one direction of stress along the contact surfaces; and that the positive-locking element has undercuts which, together with the first joining piece and the second joining piece, form a positive locking which secures the positive-locking element in the cavity.

The advantage of the solution according to the invention is that at least one component of the positive-locking element is inserted plastically into the cavity, is cured in situ and forms a molding abutting the joining pieces over their surface so that high stresses of the joining pieces cannot occur during formation of the joint, and neither can point-like tension peaks as a result of production irregularities.

The joint connection according to the invention can be produced in a simple manner if only the first joining piece is perforated and therefore the cavity is accessible only from one side. The joint connection according to the invention may, however, also be used if the recess in the second joining piece constitutes a passage, in which case the cavity may be accessible from one or two sides.

The molding may be made from any material which can be transformed from a powdered, viscous or liquid state in the cavity into a solid state.

The joint connection may be separated again without destroying the joining pieces by drilling, abrading, chemically solving or ultrasonically destroying the molding.

It is of advantage if the positive-locking element is essentially in the form of a conventional rivet with two rivet heads. In this case, the experience gained with conventional riveted joints and the calculation processes developed for these may be applied at least partially to determine the load-bearing capacity of the joint connection according to the invention.

In addition, positive-locking elements in the form of conventional rivets allow load-bearing joint connections to be produced, in which the cross-sections of the positive-locking elements along the contact surfaces are small in relation to the contact surfaces themselves, and therefore small quantities of material are sufficient for formation of the positive-locking elements.

It is particularly advantageous if the positive-locking element has at least one smooth surface which is flush with one of the joining pieces. Such a structure of the positive-locking element is simple to produce by closing off apertures of the cavity by means of plane covers after the moldable and curable material, from which the molding is formed, has been inserted.

Because there are no protruding rivet heads, such a joint connection may also result in a saving in space and weight as well as in a high gas-dynamic surface quality.

It is beneficial if the positive-locking element is made from a high temperature resistant ceramic material. While the maximum application temperature of the materials usable for conventional riveting amounts to approximately 1000° C., positive-locking elements formed from suitable high-temperature ceramic adhesives or ceramic casting compounds may be used at temperatures far above 2000° C. Ceramic adhesives based on $ZrO_2$ as well as aluminum oxide ceramic casting compounds, which additionally have a very high mechanical strength, have proved to be particularly suitable.

It is also of advantage if the positive-locking element is made from a chemically resistant ceramic material. In particular, casting compounds based on zirconium oxide are distinguished by their good chemical resistance.

It is particularly beneficial if the positive-locking element has a higher thermal expansion than the first joining piece and the second joining piece. Namely, in that case when the temperature increases, compressive stresses occur in the positive-locking element which cause an increase in load-bearing capacity in ceramic materials, for example.

It is of advantage if the positive-locking element completely fills the cavity. Such a joint connection separates the surfaces of the joining pieces facing away from one another in a gastight and liquid-tight manner, even if both joining pieces are perforated.

Conversely, if a continuous connection between surfaces of the joining pieces facing away from one another is desired for functional reasons, then it is beneficial if the positive-locking element has an opening passing through it transversely to the contact surfaces.

The embodiments of the joint connection according to the invention which may be produced in the quickest and simplest manner are those in which the positive-locking element solely comprises the molding. In that case, no further parts need to be inserted into the cavity.

However, in order to increase the load-bearing capacity of the joint connection, it is advantageous if the joint connection additionally comprises a pre-fabricated solid structure part disposed in the cavity, such as a bolt, a sleeve or similar. In this case, the molding may assume the role of compensating tolerances between the structure part and the boundary walls of the cavity so that no point-like tension peaks occur and also so that structure parts made from brittle materials, e.g. high-temperature ceramic materials, may be used.

It is beneficial if the structure part has at least one undercut which together with the molding forms a positive locking which secures the structure part in the cavity. This provides a simple means of ensuring the structure part does not fall out of the cavity.

Another advantageous possibility of securing the structure part is provided if the structure part has at least one undercut and the positive-locking element comprises at least one locking element, which abuts against the undercut and together with the structure part, the first joining piece and the second joining piece, forms a positive locking which secures the structure part in the cavity. In this case, the additional locking element, like the structure part, is a pre-formed solid component which may be produced from the same material as the structure part.

The simplest solution to securing the locking element is provided if the locking element is secured non-positively (e.g. by friction) in its position relative to the structure part.

Moreover, the joining piece may be pre-tensioned if the locking element advantageously has elastic properties as a result of its material and/or its shape, and is present in an elastically deformed state in the joint connection.

In a further advantageous embodiment of the joint connection according to the invention, the structure part has at least one undercut and the positive-locking element comprises at least one locking element which has at least one undercut, which is located opposite the undercut of the structure part, the molding fills an interstice between the undercut of the structure part and the undercut of the locking element, and together with the molding, the structure part, the first joining piece and the second joining piece, the locking element forms a positive locking which secures the structure part in the cavity.

It is beneficial if the molding has a casing which increases the strength of the molding.

The object according to the invention is also achieved by a process for the production of a joint connection between a first joining piece with a first contact surface and a passage opening onto the first contact surface, and a second joining piece with a second contact surface and a recess opening onto the second contact surface, said first joining piece and second joining piece being brought into a joining position in relation to one another, in which the first contact surface and the second contact surface abut one another and the passage of the first joining piece and the recess of the second joining piece together form a cavity, in that a moldable and curable material is inserted into the cavity; that the moldable and curable material is formed into a molding; that the molding cures so that it abuts the first joining piece and the second joining piece over their surface and forms part of a positive-locking element which, together with the first joining piece and the second joining piece, forms a positive locking which secures the first joining piece and the second joining piece relative to one another in at least one direction of stress along the contact surfaces, and has undercuts which, together with the first joining piece and the second joining piece, form a positive locking which secures the positive-locking element in the cavity.

In this case, the cavity is advantageously closed off by means of covers after the moldable and curable material has been inserted until the moldable and curable material has cured. This prevents the moldable and curable material from escaping from the cavity and any undesirable foreign substances from entering the cavity prior to curing.

It is beneficial to change the ambient conditions so that curing of the moldable and curable material may be accelerated which, depending on the type of moldable and curable material, may be achieved, for example, by increasing temperature, reducing temperature or gas supply.

In order to increase the load-bearing capacity of the joint connection, it is of advantage if a solid, pre-fabricated structure part is inserted into the cavity prior to curing of the molding.

If the structure part is advantageously inserted into the cavity prior to insertion of the moldable and curable material, then the amount of moldable and curable material necessary to fill the remaining cavity may be determined in a particularly simple manner.

In order to save weight, the structure part may be removed from the cavity after the moldable and curable material has cured. In this case the structure part merely serves to shape the molding.

If the structure part is to be removed from the cavity again, then it is beneficial if the surface of the structure part is provided with a release agent before being inserted into the cavity.

If a joint between surfaces of joining pieces facing away from one another is desired for functional reasons, then this may be produced by inserting the structure part into the cavity in such a way that after its removal from the cavity, the positive-locking element has an opening passing through the positive-locking element transversely to the contact surfaces.

The mechanical properties of the molding may be favorably influenced if the moldable and curable material is mixed with additions such as long fibers, short fibers, spheres, particles or similar, before being inserted into the cavity.

To produce a joint connection according to the invention where the cavity is accessible from only one side, it is advantageous if an flexible sack which is impermeable to the moldable and curable material is inserted into the cavity, said sack being filled with the moldable and curable material and the moldable and curable material being subjected to a pressure so that the moldable and curable material disposed in the sack is shaped into the molding, in which case the molding has undercuts which, together with the first joining piece and the second joining piece, form a positive locking which secures the positive-locking element in the cavity.

It is beneficial if the sack is secured relative to the cavity before it is filled with the moldable and curable material so as to prevent the sack from being pressed out of the cavity.

It is particularly beneficial if areas of the sack which do not abut the positive-locking element are separated off after the moldable and curable material has cured. There is then no risk of foreign objects being caught in areas of the sack protruding over the surface of the joining pieces.

The sack can be made from a textile fabric, e.g. ceramic fiber fabric or carbon fiber fabric.

A sack made of a material and with such a structure as will increase the strength of the positive-locking element is advantageously used.

It is particularly beneficial if a sack made from a material permeable to gas is used, since in this case any gas displaced by the moldable and curable material can escape through the wall of the sack and no special ventilation duct is required.

A further advantageous embodiment of the process according to the invention for the production of a joint connection when the cavity is accessible from only one side provides that the moldable and curable material is inserted into the cavity on a surface of a flexible bar, and that the moldable and curable material is shaped into the molding by a change of shape of the bar. A flexible sack may be dispensed with in this process.

To permit the bar to be used several times, it is beneficial if it is removed from the cavity after the moldable and curable material has cured.

It is particularly beneficial if the flexible bar is used to provisionally produce a joint connection between the first joining piece and the second joining piece before it is provided with the moldable and curable material. In this way, it is possible to detect the production irregularities of the joining pieces prior to formation of the joint connection and to compensate for these with the same material as is used to form the molding. This concept is particularly important when joining ceramic fiber joining pieces, since the retention of shape of these joining pieces cannot be guaranteed during production.

The change in shape of the flexible bar may, for example, be achieved by changing the pressure in a cavity within the bar.

In a further advantageous embodiment of the process according to the invention, the change in shape of the flexible bar is achieved by bending lamella which span the outer skin of the flexible bar.

Both processes described permit a reversible change in shape of the bar, so that the bar can be removed from the cavity after the molding has cured without any problem.

Each embodiment of the process according to the invention may be conducted manually as well as automatically.

The joining pieces may be pre-tensioned by stressing the joining pieces together by means of a tensioning device while the moldable and curable material is being inserted and during curing, in which case the pre-tensioning remains after the tensioning device has been removed.

In addition, the object according to the invention is achieved by a device for the production of a joint connection between a first joining piece with a first contact surface and a passage opening onto the first contact surface, and a second joining piece with a second contact surface and a recess opening onto the second contact surface, said first joining piece and second joining piece being brought into a joining position in relation to one another, in which the first contact surface and the second contact surface abut one another and the passage of the first joining piece and the recess of the second joining piece together form a cavity, in that the device comprises a gate for feeding a moldable and curable material into the cavity, covers for closing off the apertures of the cavity and a ventilation duct for discharging air displaced by the moldable and curable material from the cavity.

In addition, the object according to the invention is achieved by a device comprising a gate for feeding a moldable and curable material into the cavity, a feed-through bar for inserting a flexible sack which is impermeable to the moldable and curable material into the cavity and a plunger for applying pressure onto the moldable and curable material. Such a device should preferably be provided for the production of a joint connection where the cavity is accessible only from one side.

It is beneficial if such a device comprises a means for securing the sack in its position relative to the cavity. Such a means may prevent the sack from being pressed out of the cavity during shaping of the moldable and curable material.

It is particularly beneficial if the device additionally comprises a separation means to separate off areas of the sack which do not abut against the cured moldable and curable material.

Advantageously, the device comprises not only a gate, covers for closing off the apertures of the cavity and a ventilation duct, but also a feed-through bar for inserting a sack into the cavity and a plunger. Such a device is equally suitable for the production of a joint connection according to the invention when the cavity is accessible from one and from both sides.

If the device has a gate and/or a ventilation duct, then it is of advantage if the device additionally has at least one sluice and at least one connection piece, through which the gate and/or the ventilation duct may be connected to the sluice for flushing with a rinsing medium. This can prevent the gate and/or the ventilation duct from being blocked by the cured moldable and curable material.

In addition, the object according to the invention may be achieved by a device comprising a flexible bar, on the surface of which a moldable and curable material may be disposed, which may be inserted into the cavity and the shape of which may be changed in such a way that the moldable and curable material disposed on the surface of the bar is shaped by changing the shape of the bar in the cavity into a molding, which has undercuts which, together with the first joining piece and the second joining piece, form a positive locking which secures the molding in the cavity. Such a device is particularly suitable for the production of a joint connection with a positive-locking element which has an opening passing through the positive-locking element transversely to the contact surfaces.

In an advantageous embodiment of such a device, the flexible bar has a flexible casing, which may be subjected to an internal pressure in such a way as to change the shape of the bar.

In a further advantageous embodiment of such a device, the flexible bar has lamella, which span a flexible casing of the flexible bar, and may be bent in such a way as to change the shape of the flexible bar.

In all the devices described above, it is of advantage if the device comprises a fastening device for securing the device on at least one of the joining pieces.

It is beneficial if such a fastening device comprises means for sealing a suction chamber which may be evacuated so that the device is pressed by the external air pressure onto at least one of the joining pieces after the suction chamber has been evacuated.

In order to accelerate the curing process, the device advantageously has a heating device for heating the moldable and curable material.

To facilitate the insertion of structure parts into the cavity for the purpose of increasing the load-bearing capacity of the joint connection, it is of advantage if the device comprises a plunger disposed in a continuous hole in the device for insertion of a structure part into the cavity.

Further features and advantages of the invention are the subject of the following description and of the figures showing several embodiments.

BRIEF DESCRIPTION OF THE DRAWING

FIG. 20 shows a sectional side view of the fifth embodiment of the device according to the invention, with the moldable and curable material being shaped into a positive-locking element according to an embodiment of the process according to the invention.

DETAILED DESCRIPTION OF THE INVENTION

Identical elements or elements of identical function are given the same references in all figures.

Figure 1:
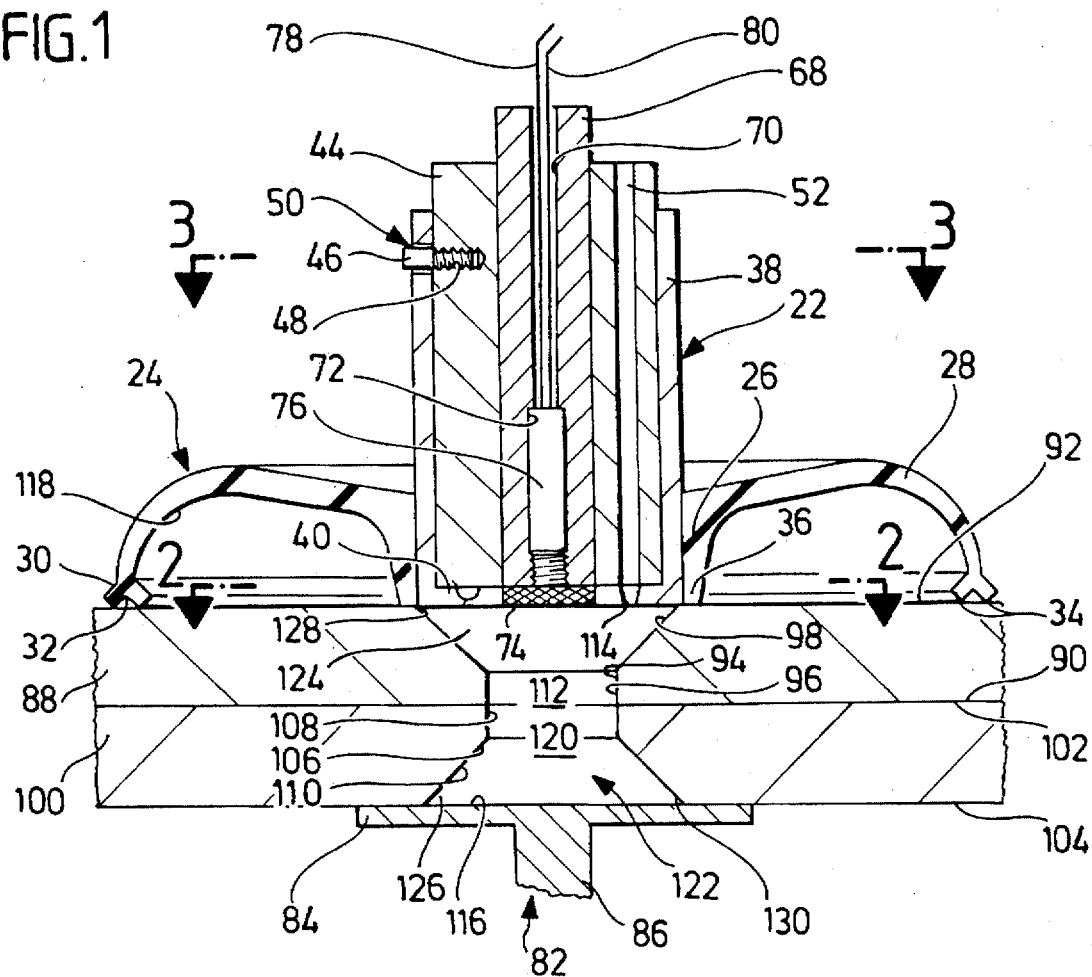
FIG. 1 shows a sectional side view through a first embodiment of a device according to the invention for the production of a joint connection when the cavity is accessible from both sides, and a joint connection according to the invention.
Figure 2:
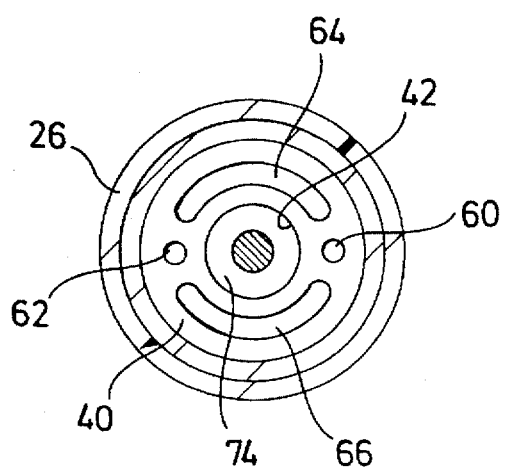
FIG. 2 shows a cross-section through the first embodiment of a device according to the invention along line 2—2 in FIG. 1.
Figure 3:
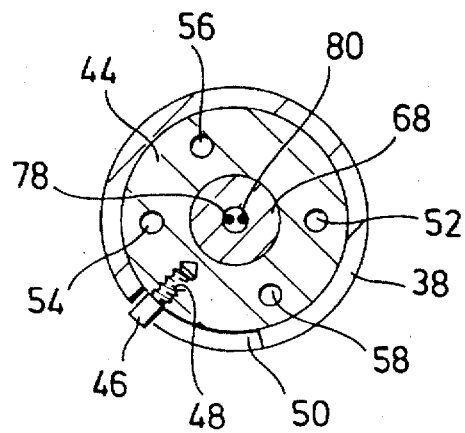
FIG. 3 shows a cross-section through the first embodiment of a device according to the invention along line 3—3 in FIG. 1.

The first embodiment of the device according to the invention shown in FIGS. 1 to 3 is particularly suitable for the production of joint connections when the cavity is accessible from both sides. The device, which is given the overall reference 22, comprises a fastening device 24 for securing the device 22 on one surface. This fastening device 24 has a holding tube 26 made of an elastic material, e.g. rubber, with a vertically directed axis. A suction bellows 28 made of an elastic material which extends radially outwards from the holding tube 26 is molded onto an upper end of the holding tube 26, so that the suction bellows 28 together with the holding tube 26 essentially has the form of a torus halved perpendicular to its axis of symmetry. A ring-shaped support bead 30 is molded onto an edge of the suction bellows 28 facing away from the holding tube 26. The support bead 30 has a wedge-shaped annular groove 32 which divides its underside into two ring-shaped sealing lips 34. The sealing lips 34 extend in the same plane as a lower edge of the holding tube 26 which is constructed as a sealing bead 36.

An outer tube 38 is disposed in the holding tube 26 concentrically thereto and connected non-positively (by friction) to the holding tube 26. The outer tube 38 has a base 40 with a central hole 42 passing vertically through the base 40.

An inner tube 44 concentric to this outer tube 38 is arranged therein with slight play to lie on the base 40, its inside diameter corresponding to the diameter of the hole 42.

The inner tube 44 is rotatable in the outer tube 38 between a left and a right stop position of a stop pin 46, which is threaded into a radial threaded blind hole 48 arranged in the wall of the inner tube 44 and is guided by a horizontally extending elongated hole 50 passing through the wall of the outer tube 38. The left and right stop positions of the stop pin 46 have an angular distance of approximately 50°.

The wall of the inner tube 44 has four axial channels, i.e. a gate 52, a ventilation duct 54, a first sluice 56 and a second sluice 58. Channels 52, 54, 56 and 58 are each located at equal radial distance from the axis of the inner tube 44. The gate 52 and the ventilation duct 54 lie opposite one another. The first sluice 56 also lies opposite the second sluice 58. The position of the gate 52 has an angular distance of approximately 110° relative to the position of the first sluice 56, viewed from above in clockwise direction relative to the axis of the inner tube 44.

When the stop pin 46 is in its left stop position, as shown in FIG. 3, then the gate 52 is flush with a feed hole 60 passing vertically through the base 40 of the outer tube 38 and the ventilation duct 54 is flush with a ventilation hole 62 passing vertically through the base 40. The first sluice 56 feeds into a first arc-shaped connection groove 64 arranged on the upper side of the base 40, and the second sluice 58 feeds into a corresponding second arc-shaped connection groove 66. Connection grooves 64 and 66 each have a semicircular cross-section and, as shown in FIG. 2, each extend between the feed hole 60 and the ventilation hole 62 over a sector of approximately 130°.

However, if the stop pin 46 is in its right stop position, the gate 52 and the first sluice 56 both feed into the first connection groove 64. This forms a flow-through connection between the gate 52 and the first sluice 56. Accordingly, the ventilation duct 54 and the second sluice 58 feed into the second connection groove 66, which results in a flow-through connection between the ventilation duct 54 and the second sluice 58.

A cylindrical plunger 68 is arranged concentrically to the inner tube 44 to slide with slight play therein. The cylindrical plunger 68 has a first central hole 70 in an upper portion and a second central hole 72 in a lower portion. The first hole 70 has a smaller diameter than the second hole 72 and opens into the second hole 72. Another end of the first hole 70 opens onto an upper face of the cylindrical plunger 68.

The second hole 72 opens onto a lower face of the cylindrical plunger 68 and is provided with a thread in a lower portion, into which a screw plug 74 is threaded, the cylindrical head of which has the same diameter as the cylindrical plunger 68.

A heating cartridge 76 connected to an external power supply (not shown) via supply lines 78 and 80 directed through the first hole 70 is arranged in the second hole 72 closed off by the screw plug 74.

In addition, the device 22 comprises a dolly 82 which has a flat cylindrical pressure disc 84 held by a similarly cylindrical handle 86 concentric thereto.

A plate-shaped first joining piece 88 has a lower surface defined as contact surface 90 and an upper surface defined as the upper side 92. The first joining piece 88 has a passage 94 running through it, which comprises a lower cylindrical section 96 and an upper truncated cone shaped section 98 concentric thereto, the common axis of both sections 96 and 98 lying at right angles on surfaces 90 and 92, the diameter of the cylindrical section 96 corresponding to the smallest diameter of the truncated cone shaped section 98, and the truncated cone shaped section 98 widening towards the upper side 92.

A plate-shaped second joining piece 100 has an upper surface defined as contact surface 102 and a lower surface defined as the underside 104. The second joining piece 100 has a passage 106, which comprises an upper cylindrical section 108 and a lower truncated cone shaped section 110 concentric thereto, the common axis of the two sections 108 and 110 lying at right angles on surfaces 102 and 104, the diameter of the cylindrical section 108 corresponding to the smallest diameter of the truncated cone shaped section 110, and the truncated cone section 110 widening towards the underside 104.

In order to produce a joint connection according to the invention, the first joining piece 88 and the second joining piece 100 are brought into a joining position relative to one another, in which the contact surface 90 of the first joining piece 88 and the contact surface 102 of the second joining piece 100 abut one another and the cylindrical sections 96, 108 of the passages 94, 106 are flush with one another so that passages 94 and 106 together form a cavity 112, as shown in FIG. 1.

The device 22 is arranged on the first joining piece 88 in such a way that the sealing bead 36 and the sealing lips 34 abut against the upper side 92 and the base 40 of the outer tube 38 covers an upper aperture 114 of the cavity 112.

The holding tube 26, the suction bellows 28 with the support bead 30 and the upper side 92 of the first joining piece 88 enclose an airtight closed suction chamber 118, which is evacuated via a connection (not shown) to a vacuum pump. As a result of the underpressure generated in the suction chamber 118, the suction bellows 28, the holding tube 26 and the outer tube 38 connected non-positively to the holding tube 26 are pressed onto the first joining piece 88 so that the device 22 is secured in its position relative to the cavity 112.

The cylindrical plunger 68 is pushed into the inner tube 44 until the underside of the screw plug 74 is flush with an underside of the base 40. This forms a plane cover which closes off the upper aperture 114 of the cavity 112 except for the feed hole 60 and the ventilation hole 62.

A lower aperture 116 of the cavity 112 is closed off by means of the dolly 82, the pressure disc 84 being pressed against the underside 104 of the second joining piece 100 by means of a pressure on the handle 86.

The stop pin 46 is now brought into its right stop position, in which the gate 52 is flush with the feed hole 60 and the ventilation duct 54 is flush with the ventilation hole 62.

A moldable and curable material is poured or injected into the cavity 112 through the gate 52 and the feed hole 60, in which case the air displaced from the cavity 112 escapes through the ventilation hole 62 and the ventilation duct 54. The filling process is continued until moldable and curable material is discharged from the ventilation duct 54. This ensures that the cavity 112 is completely filled with the moldable and curable material.

Any materials which may be transformed from a viscous or paste-like state into a solid state can be used as moldable and curable material. Examples of these are ceramic slip or adhesive, fusible metals or non-metals, thermosetting plastics or mixtures of some of these materials.

Ceramic materials are above all suitable for the production of joint connections which are resistant in the high temperature range (above about 1000° C.).

Those which have proved particularly effective are single-component ceramic adhesives based on $ZrO_2$, which may be used up to temperatures of 2400° C., and aluminum oxide ceramic casting compounds which have a very high mechanical strength.

Chemically resistant materials such as glass or ceramic materials are suitable for the production of joint connections which are resistant under chemically aggressive ambient conditions.

Those which have proved particularly effective are casting compounds based on zirconium oxide which have a good chemical resistance.

The mechanical properties of the joint connection may be influenced by mixing additions such as long fibers, short fibers, spheres, particles or similar materials with the moldable and curable material.

Once the filling process has ended, the stop pin 46 is brought into its right stop position. The moldable and curable material remaining in the gate 52 is flushed out using a rinsing medium flowing under pressure through the first sluice 56, connection groove 64 and gate 52. The moldable and curable material remaining in the ventilation duct 54 is likewise flushed out using a rinsing medium flowing under pressure through the second sluice 58, connection groove 66 and ventilation duct 54. Air or water may be used, for example, as rinsing medium.

The moldable and curable material introduced into the cavity 112 cures and forms a solid molding 120.

The process of curable can be accelerated by changing the ambient conditions (increasing or reducing temperature, gas supply), depending on the moldable and curable material used.

In the first embodiment of the device according to the invention shown in FIG. 1, the power circuit is closed during curing by the heating cartridge 76 so that thermal energy is transferred from the heating cartridge 76 to the material contained in the cavity 112 via the screw plug 74. For this purpose, the screw plug 74 is made of a material with high thermal conductivity.

The molding 120 formed in the cavity 112 abuts against the boundary walls of passages 94 and 106 over their surfaces. The molding 120 constitutes a positive-locking element 122 which, together with the first joining piece 88 and the second joining piece 100, forms a positive locking which secures the first joining piece 88 and the second joining piece 100 relative to one another in directions of stresses aligned parallel to contact surfaces 90, 102.

In addition, the positive-locking element 122 has an upper truncated cone shaped section 124 and a lower truncated cone shaped section 126, the generated surfaces of which constitute undercuts 128 and 130 respectively which, together with the first joining piece 88 and the second joining piece 100, form a positive locking which secures the positive-locking element 122 in the cavity 112.

Hence, the joining pieces 88 and 100 are protected against shearing and the positive-locking element 122 is prevented from falling out of the cavity 112.

After the molding 120 has cured, the suction chamber 118 is ventilated, whereupon the device 22 can be removed from the upper side 92 of the first joining piece 88. The dolly 82 is also removed from the underside 104 of the second joining piece 100.

All the specified process steps may be conducted manually or automatically.

If the joint connection thus produced is exposed to high temperatures, then it is expedient to select a moldable and curable material which leads to a thermal expansion of the positive-locking element 122 greater than the thermal expansion of the joining pieces 70 and 82. Thus, when the temperature increases, degrees of compressive stress result in the material of the positive-locking element 122 which cause an increase in the load-bearing capacity.

The load-bearing capacity may be further increased by inserting structure parts such as bolts, sleeves or similar into the cavity 112 in addition to the moldable and curable material. The positive-locking element 122 in this case comprises both the molding 120 and the structure part.

Figure 4:
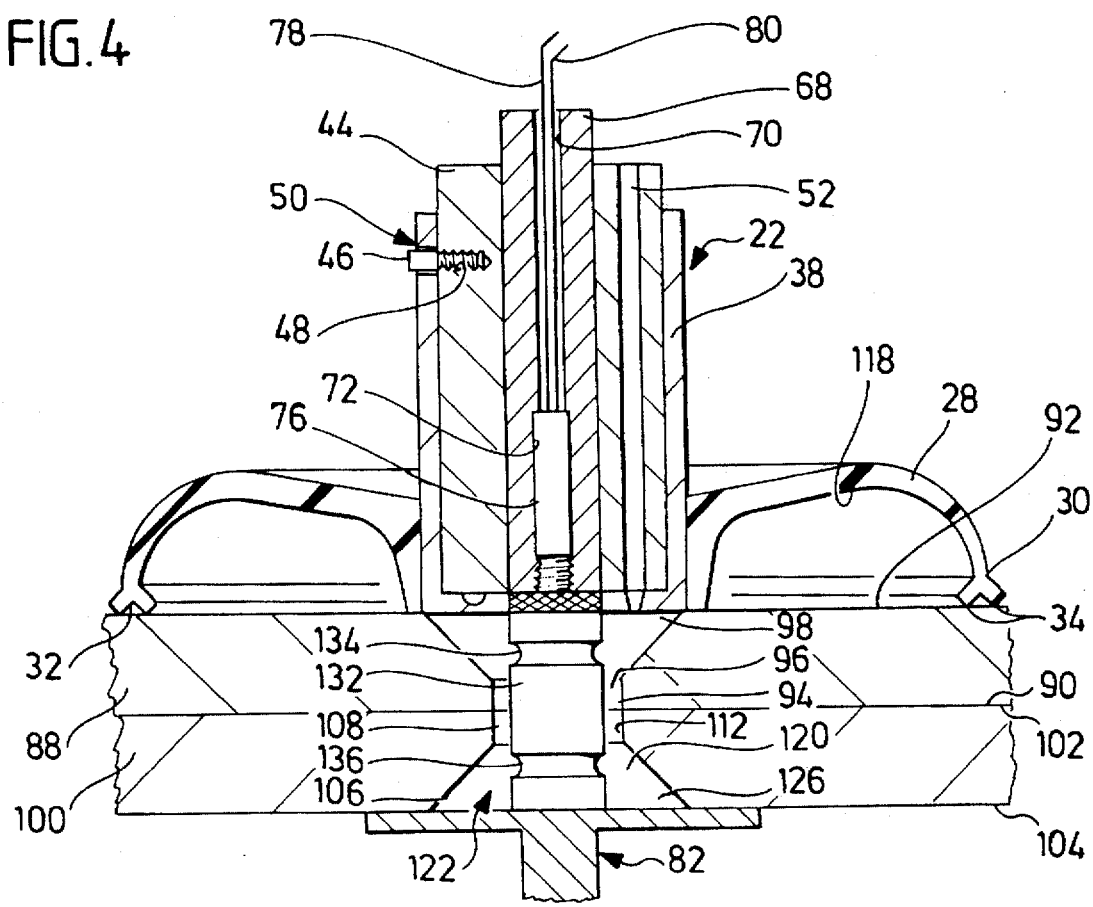
FIG. 4 shows a sectional side view through the first embodiment of a device according to the invention and an embodiment of the joint connection according to the invention with a structure part inserted into the cavity.

Such a structure part 132 is shown in FIG. 4 in the form of a cylindrical bolt which has been pressed into the cavity 112 through the inner tube 44 by means of the cylindrical plunger 68.

The structure part 132 may be pressed into the moldable and curable material which has already been fed into the cavity but has not yet cured.

However, it is also possible to firstly insert the structure part 132 into the cavity 112 and then fill the remaining volume of the cavity 112 with moldable and curable material. In the latter case, the required amount of moldable and curable material is simpler to determine.

The structure part 132 has two ring-shaped grooves 134 and 136 extending along the periphery of the structure part 132, each having a semicircular cross-section. A respective ring-shaped projection of the molding 120 engages in each of these ring-shaped grooves 134 and 136 so that the ring-shaped grooves 134 and 136 form undercuts which, together with the molding 120, form a positive locking after the molding 120 has cured which secures the structure part 132 in the cavity 112.

FIGS. 5 to 9 show further embodiments of the joint connection according to the invention using structure parts 132 when the cavity 112 is accessible from both sides. These embodiments of the joint connection according to the invention can be produced without using the above-described device according to the invention.

Figure 5:
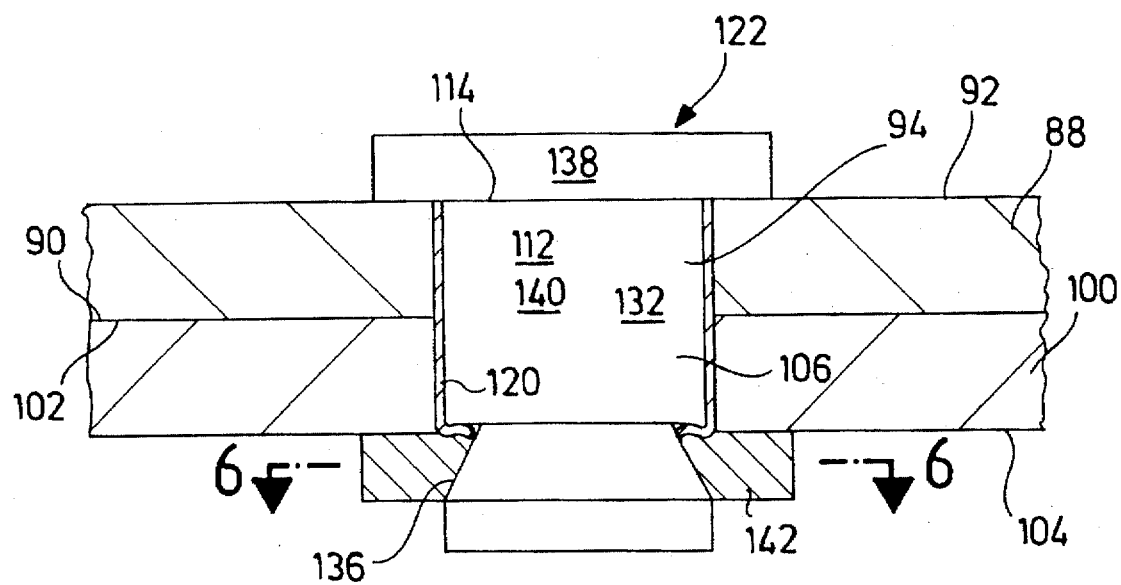
FIG. 5 shows a sectional side view of a joint connection according to the invention with a structure part, which is secured in the cavity by means of a locking element with a trapezoidal cross-section.
Figure 6:
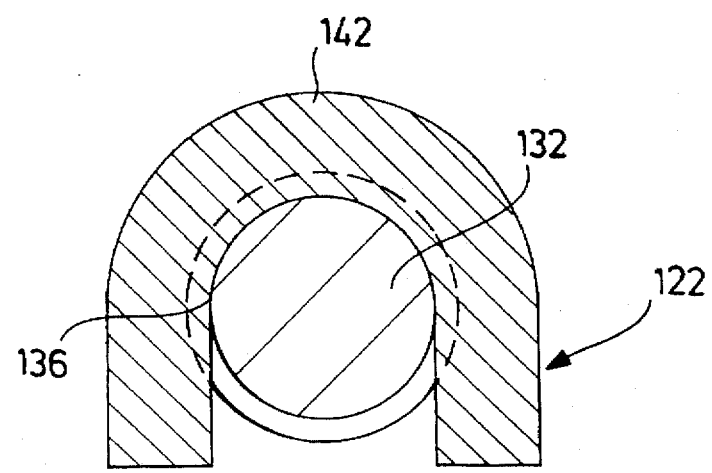
FIG. 6 shows a cross-section through the joint connection according to the invention from FIG. 5 along line 6—6 in FIG. 5.

FIGS. 5 and 6 show a joint connection according to the invention between a first joining piece 88 with a cylindrical passage 94 and a second joining piece 100 with a cylindrical passage 106. The joining pieces 88 and 100 are in a joining position, in which the contact surface 90 of the first joining piece 88 and the contact surface 102 of the second joining piece 100 abut one another and passages 94 and 106 are flush with one another.

A structure part 132 is inserted into the cavity 112 formed by passages 94 and 106. The structure part 132 is in the form of a bolt with a cylindrical bolt head 138, the diameter of which exceeds the cross-section of passage 94, with a cylindrical bolt shaft 140 and a ring-shaped groove 136 extending along the periphery of the bolt shaft 140 with a wedge-shaped cross-section. The bolt head 138 may also be constructed as a half-round head or as a countersunk head.

The structure part 132 lies on the upper side 92 of the first joining piece 88 with an edge of the bolt head 138 projecting over the upper aperture 114 of the cavity 112. In this position, an upper edge of the groove 135 lies slightly above the underside 104 of the second joining piece 100.

As shown in FIG. 6, a U-shaped retaining washer 142 with a trapezoidal cross-section is inserted into the groove 136. The retaining washer 142 abuts along a sector of 180° against the ring-shaped groove 136 and with an upper side against the underside 104 of the second joining piece 100.

The diameter of the cylindrical bolt shaft 140 is smaller than that of the cavity 112 so that a tubular interstice, which is completely filled by a molding 120 formed by curing of a moldable and curable material, remains between the bolt shaft 140 and the boundary walls of passages 94 and 106. Therefore, the molding 120 compensates for the fit tolerance between the bolt shaft 140, bolt head 138 and joining pieces 88, 100.

At its lower end the tubular molding 120 bears a radially inward protruding ring-shaped shoulder 144, which engages into the ring-shaped groove 136.

The positive-locking element 122 in this case comprises the molding 120, structure part 132 and the retaining washer 142, and together with the first joining piece 88 and the second joining piece 100 forms a positive locking, which secures the first joining piece 88 and the second joining piece 100 relative to one another in directions of stress parallel to the contact surfaces 90 and 102.

Moreover, the molding 120 secures the retaining washer 142 non-positively in the ring-shaped groove 136.

Together with the retaining washer 142, the first joining piece 88 and the second joining piece 100, the structure part 132 forms a positive locking which secures the structure part 132 in the cavity 112.

Figure 7:
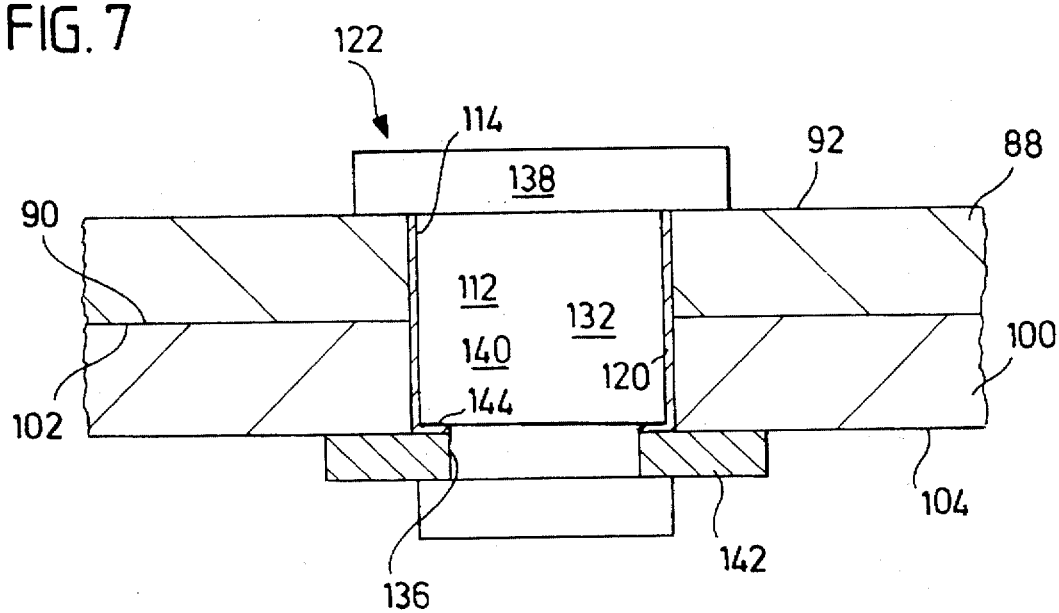
FIG. 7 shows a sectional side view of a joint connection according to the invention with a structure part, which is secured in the cavity by means of a locking element with a rectangular cross-section.

The further embodiment of the joint connection according to the invention shown in FIG. 7 differs from the embodiment shown in FIGS. 5 and 6 in that the ring-shaped groove 136 and the retaining washer 142 have a rectangular instead of a wedge-shaped or trapezoidal cross-section.

Figure 8:
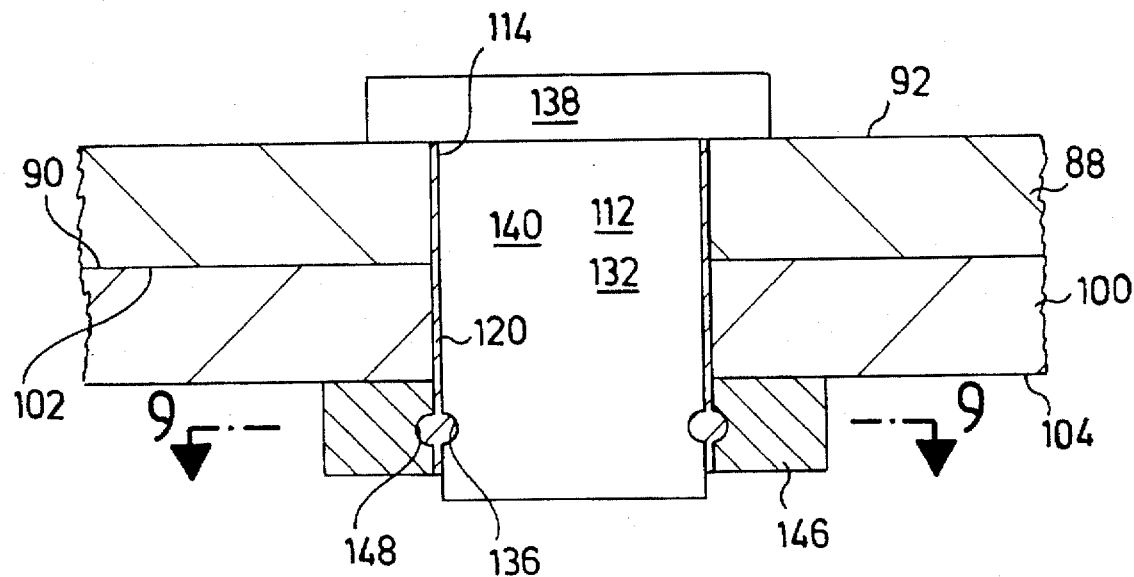
FIG. 8 shows a sectional side view of a joint connection according to the invention, which is secured in the cavity by means of a ring-shaped locking element.
Figure 9:
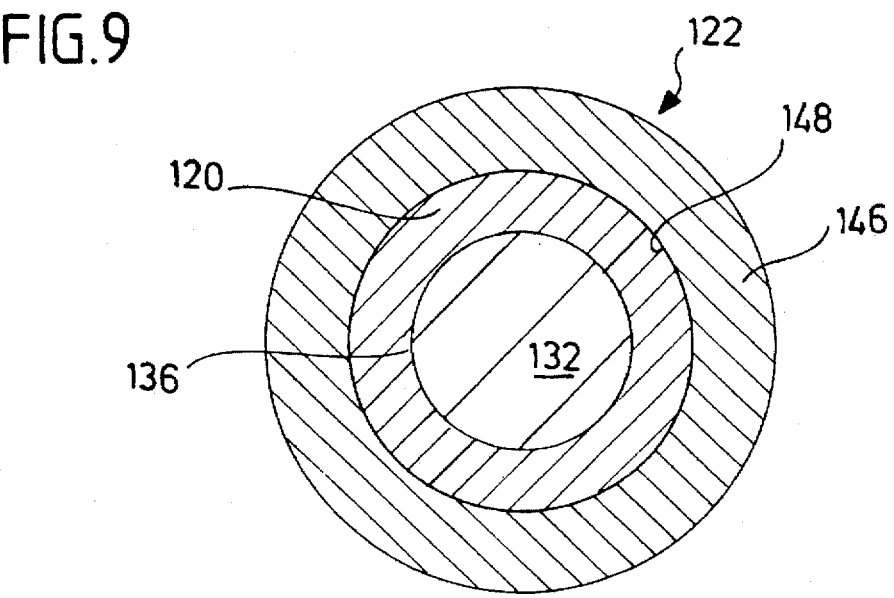
FIG. 9 shows a cross-section through the joint connection according to the invention from FIG. 8 along line 9—9 in FIG. 8.

In the further embodiment of the joint connection according to the invention shown in FIGS. 8 and 9, the ring-shaped groove 136 has a semicircular cross-section. A closed locking ring 146 with a rectangular cross-section is arranged to surround the bolt shaft 140 concentrically and abuts with an upper side against the underside 104 of the second joining piece 100. A ring aperture of the locking ring 146 lies flush with passage 106. The inside of the locking ring 146 has a ring-shaped groove 148 with semicircular cross-section lying opposite the ring-shaped groove 136 of the structure part 132.

A molding 120 formed by curing from a moldable and curable material completely fills the interstice between the structure part 132 on the one hand and the first joining piece 88, second joining piece 100 and locking ring 146 on the other hand.

In this case, the positive-locking element 122 comprises the molding 120, structure part 132 and locking ring 146, and together with the first joining piece 88 and the second joining piece 100, forms a positive locking which secures the two joining pieces 88 and 100 relative to one another in directions of stress parallel to the contact surfaces 90 and 102. Moreover, together with the structure part 132, the first joining piece 88, second joining piece 100 and the locking ring 146, the molding 120 forms a positive locking which secures the structure part 132 in the cavity 112.

The embodiments of the device according to the invention and the process according to the invention described below are used for the production of a joint connection where the cavity 112 is accessible from only one side.

Figure 10:
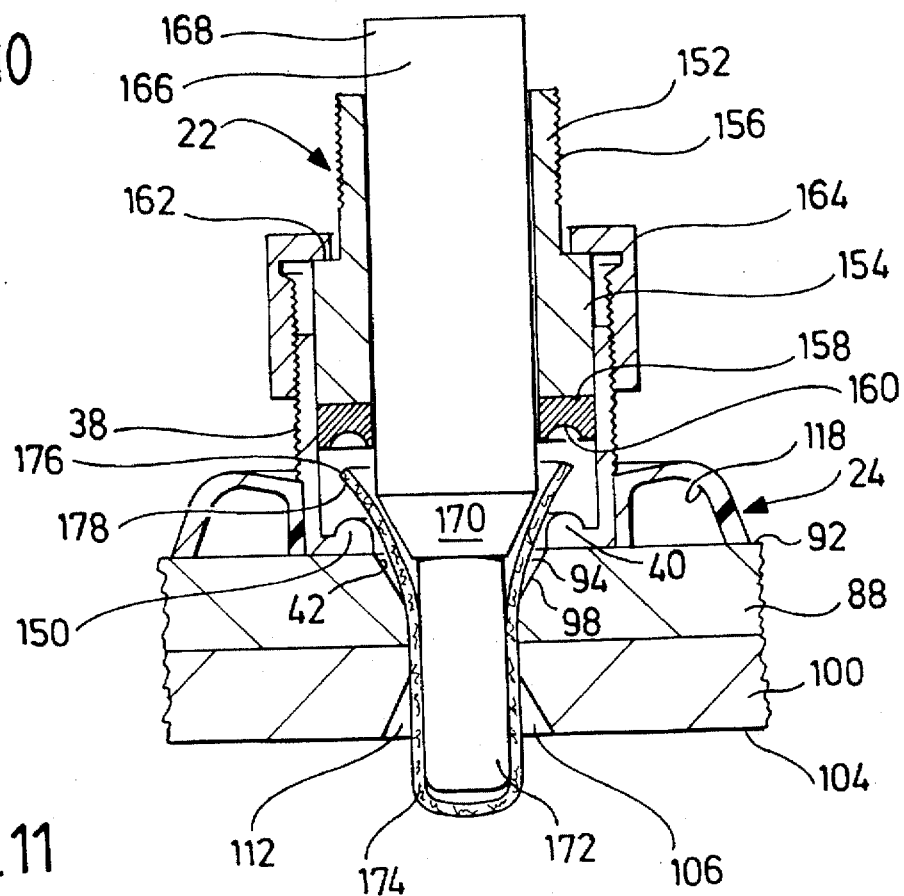
FIG. 10 shows a sectional side view of a second embodiment of the device according to the invention for the production of a joint connection when the cavity is accessible from one side, with a fabric sack being inserted into the cavity according to an embodiment of the process according to the invention.

The second embodiment of the device according to the invention shown in FIG. 10 and given the overall reference 22 comprises a fastening device 24 and an outer tube 38, as has already been described in conjunction with the first embodiment of the device according to the invention.

The outer tube 38 has a base 40 with a central hole 42 which on an upper side bears a first ring-shaped clamping jaw 150 with a semicircular cross-section.

A tubular locating plunger 152 with a lower thick-walled section 154 and an upper thin-walled section 156 is disposed concentrically to the outer tube 38 to slide therein with slight play. Both sections 154, 156 of the locating plunger 152 have the same inside diameter corresponding to the diameter of the base hole 42.

An underside of the lower thick-walled section 154 has a second ring-shaped clamping jaw 158 with a rectangular cross-section and made of an elastic material. On an underside, the second clamping jaw 158 has a ring-shaped clamping groove 160 with a semicircular cross-section, the radius of which corresponds to the radius of the semicircular cross-section of the first clamping jaw 150. The clamping groove 160 is located at the same radial distance from the axis of the outer tube 38 as the first clamping jaw 150. The locating plunger 152 can thus be brought into a lower stop position, in which the clamping groove 160 abuts against the first clamping jaw 150.

In an upper stop position, a step 162 on an outer side of the locating plunger 152, on which the thick-walled section 154 of the locating plunger 152 merges into the thin-walled section 156, abuts against an underside of an inner edge of a retaining nut 164 screwed onto an external thread on an upper end of the outer tube 38. The height of an upper stop position of the locating plunger 152 may be varied by further tightening or loosening the retaining nut 162 onto or from the external thread of the outer tube 38.

A cylindrical guide section 166 of a feed-through bar 168 is guided with slight play in the tubular locating plunger 152 concentrically thereto. On an underside, guide section 166 bears a truncated cone shaped stop section 170, which in turn bears a cylindrical feed-through section 172.

FIGS. 10 to 14 show the second embodiment of the device according to the invention with different process steps of an embodiment of the process according to the invention for the production of a joint connection when the cavity 112 is accessible from one side.

The first joining piece 88 and the second joining piece 100, as well as their joining position, are identical to joining pieces 88 and 100 described in conjunction with FIG. 1 and their joining position described there.

The device 22 is positioned on the upper side 92 of the first joining piece 88 in such a way that the base hole 42 is flush with the truncated cone shaped section 98 of passage 94. The device 22 is secured on the first joining piece 88 by evacuating the suction chamber 118 as described above.

The retaining nut 164 is threaded approximately half way onto the external thread of the outer tube 38. The locating plunger 152 is in its upper stop position.

The feed-through bar 168 is now pulled upwards out of the locating plunger 152 and a fabric sack 174 with an opening 176 is inverted via the feed-through section 172, the stop section 170 and a part of the guide section 166 of the feed-through bar 168 adjoining the stop section 170 so that an edge 178 of the sack opening 176 surrounds the guide section 166. The width of the fabric sack 174 is selected so that it closely abuts against the surface of the feed-through bar 168.

The feed-through bar 168 covered with the fabric sack 174 is inserted with the feed-through section 172 first from above into the tubular locating plunger 152 and pressed downwards until the stop section 170 covered with the fabric sack 174 abuts against the boundary wall of the truncated cone shaped section 98 of the first passage 94. The edge 178 of the sack opening 176 is then located in an interstice between the clamping groove 160 and the first clamping jaw 150.

Figure 11:
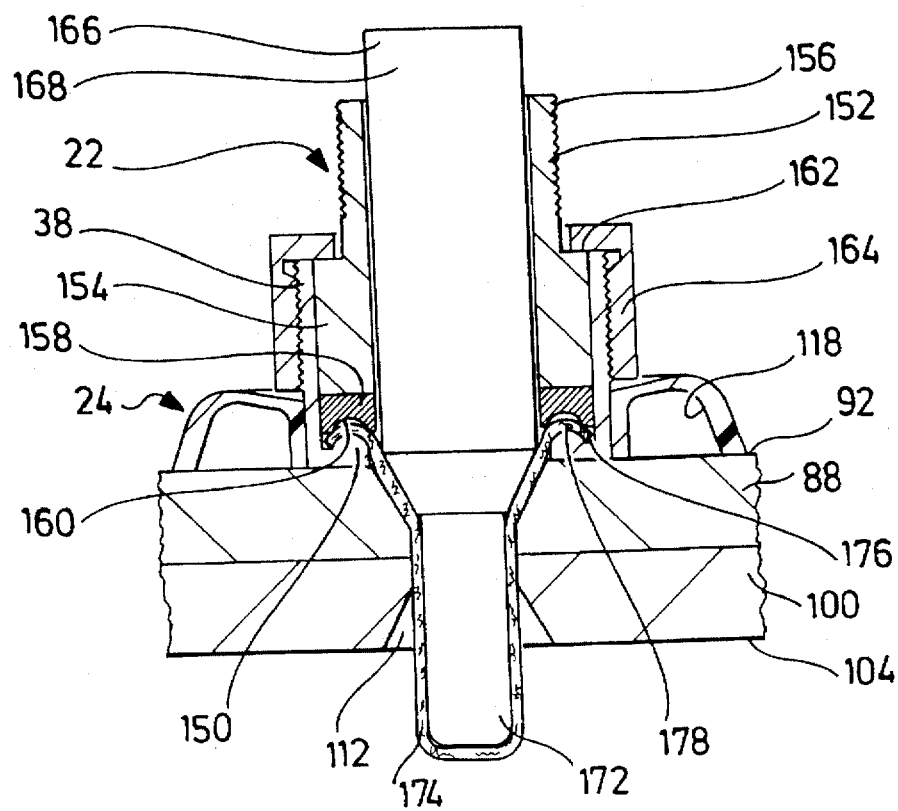
FIG. 11 shows a sectional side view of the second embodiment of the device according to the invention, with the edge of the opening of the fabric sack being secured according to an embodiment of the process according to the invention.

FIG. 11 shows how the edge 178 of the sack opening 176 is secured. For this, the locating plunger 152 is brought into its lower stop position, as a result of which the edge 178 of the sack opening 176 is clamped between the clamping groove 160 and the first clamping jaw 150. The retaining nut 164 is then threaded onto the external thread of the outer tube 38 until an underside of its inner edge once again abuts against the step 162 of the locating plunger 152. In this way, the locating plunger 152 is secured in its position.

The feed-through bar 168 is then pulled upwards out of the locating plunger 152, and the fabric sack 174 remains in its position in the cavity 112.

Figure 12:
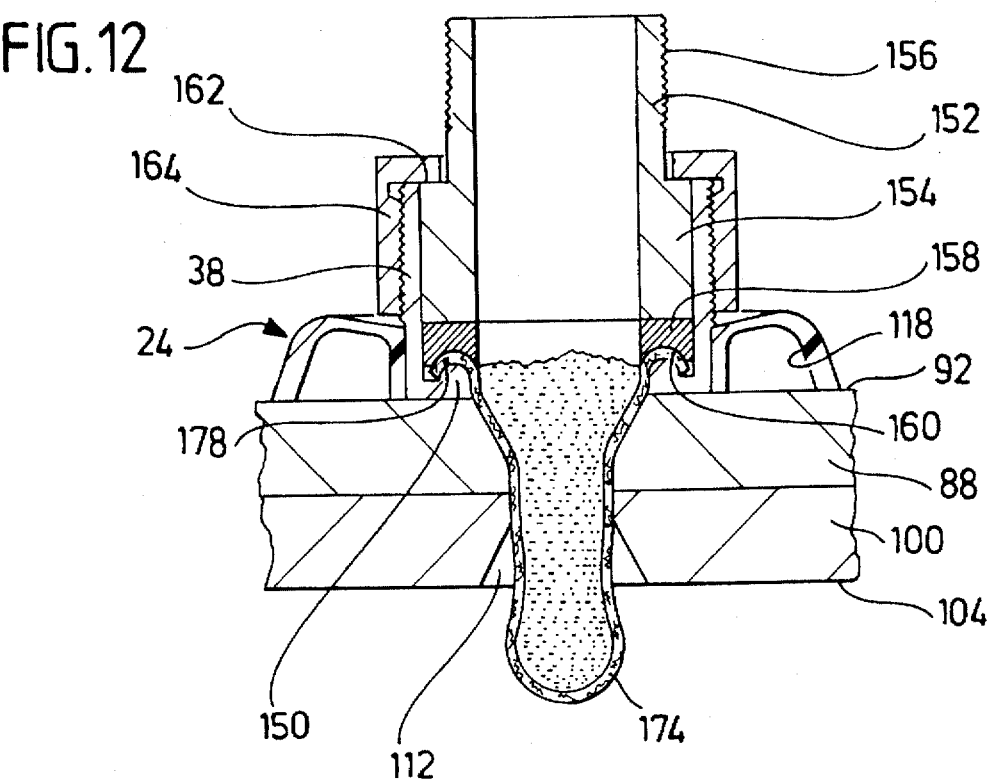
FIG. 12 shows a sectional side view of the second embodiment of the device according to the invention, with the sack being filled with a moldable and curable material according to an embodiment of the process according to the invention.

FIG. 12 shows the fabric sack 174 filled from above with a moldable and curable material by the locating plunger 152. In this case, the section of the sack 174 located underneath the first joining piece 88 retains, for the moment, an essentially cylindrical shape.

Figure 13:
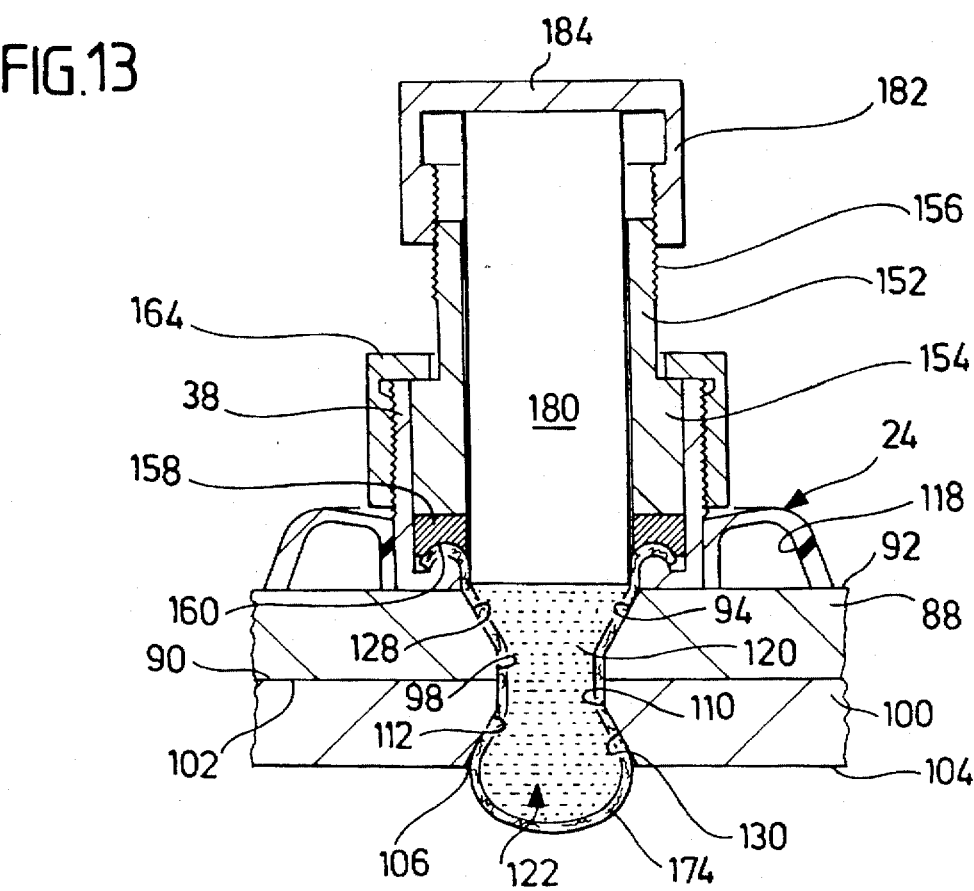
FIG. 13 shows a sectional side view of the second embodiment of the device according to the invention, with the moldable and curable material being pressed according to an embodiment of the process according to the invention.

To conduct the next process step shown in FIG. 13, a cylindrical plunger 180 is required with a diameter slightly smaller than the inside diameter of the locating plunger 152. The plunger 180 is inserted from above into the locating plunger 152 until a lower face of the plunger 180 sits on the moldable and curable material.

A pressure cap 182 in the form of a cylindrical tube provided with a cover 184 and an internal thread is now screwed onto an external thread on an upper end of the locating plunger 152. As soon as the inside wall of the cover 184 abuts against an upper face of the plunger 180, the pressure cap 182 exerts pressure onto the plunger 180 and the latter in turn exerts pressure onto the moldable and curable material, which when the pressure cap 182 is tightened further onto the external thread of the locating plunger 152 causes the moldable and curable material in the fabric sack 174 to be compressed and pressed.

This pressing causes the fabric sack 174 to be molded against the boundary walls of the cavity 112. The areas of the fabric sack 174 abutting against the boundary walls of the truncated cone shaped sections 98, 110 of the passages 94, 106 thus form undercuts 128, 130 which secure the fabric sack 174 in the cavity 112.

The structure of the material of the fabric sack 174 is such that the moldable and curable material cannot flow through its wall. However, the fabric sack 174 is permeable to the air so that the device 22 does not require a ventilation duct.

Suitable materials for the fabric sack 174 are textile fabrics such as ceramic fiber fabrics or carbon fiber fabrics.

The pressure on the moldable and curable material is maintained until the moldable and curable material is cured and a solid molding 120 has formed. This molding 120 constitutes a positive-locking element 122 which, together with the first joining piece 88 and the second joining piece 100, forms a positive locking which secures the first joining piece 88 and the second joining piece 100 relative to one another in directions of stress parallel to contact surfaces 90 and 102.

Moreover, the positive-locking element 122 has undercuts which, together with the first joining piece 88 and the second joining piece 100, form a positive locking which secures the positive-locking element 122 in the cavity 112.

After the molding 120 has cured, the pressure cap 182 is unscrewed from the locating plunger 152 and the plunger 180 removed from the locating plunger 152.

Figure 14:
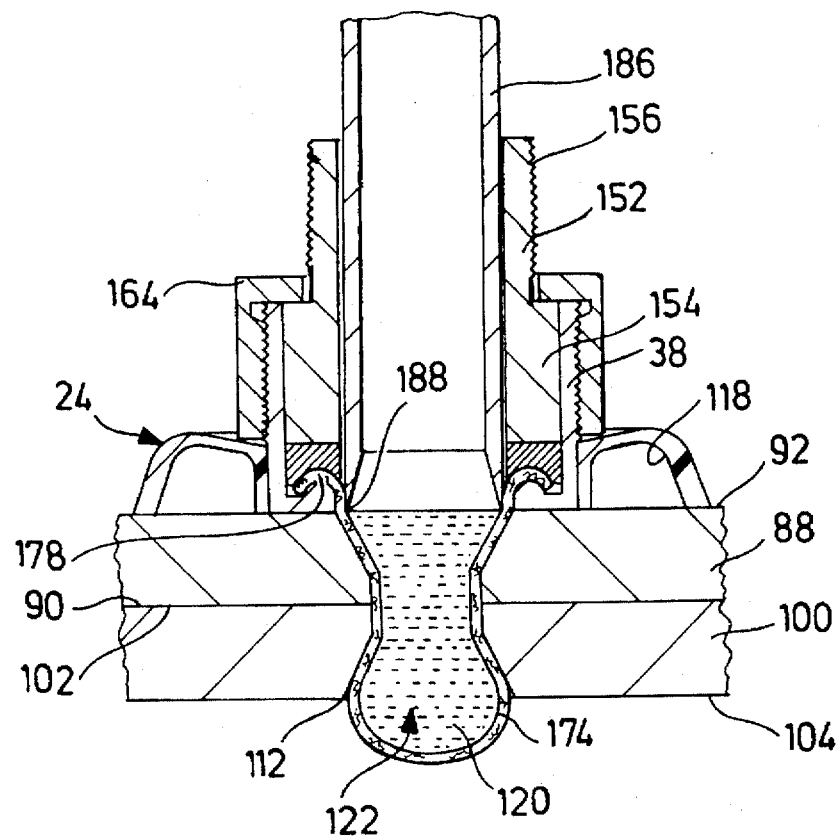
FIG. 14 shows a sectional side view of the second embodiment of the device according to the invention, with the edge of the sack surrounding the sack opening being separated according to an embodiment of the process according to the invention.

FIG. 14 shows how the edge 178 of the fabric sack 174 projecting over the upper side 92 of the first joining piece 88 is separated. For separation, a cylindrical cutting tube 186 is used which has the same outside diameter as the plunger 180, its wall tapering in a wedge shape towards one end of the tube so that a sharp ring-shaped cutting edge 188 is formed on the appropriate end of the tube.

The cutting tube 186 is inserted from above with its cutting edge 188 first into the locating plunger 152 until the cutting edge 188 abuts against the edge 178 of the fabric sack 174 and separates this by applying force from above onto the cutting tube 186.

The device 22 can be removed from the first joining piece 88 after the suction chamber 118 has been ventilated.

This embodiment of the process according to the invention is thus concluded.

The moldable and curable material may also be compressed and pressed in the process described by pressing a structure part 132 into the moldable and curable material disposed in the fabric sack 174 by means of the plunger 180. In this case the molding 120 and the structure part 132 together form the positive-locking element 122.

Figure 15:
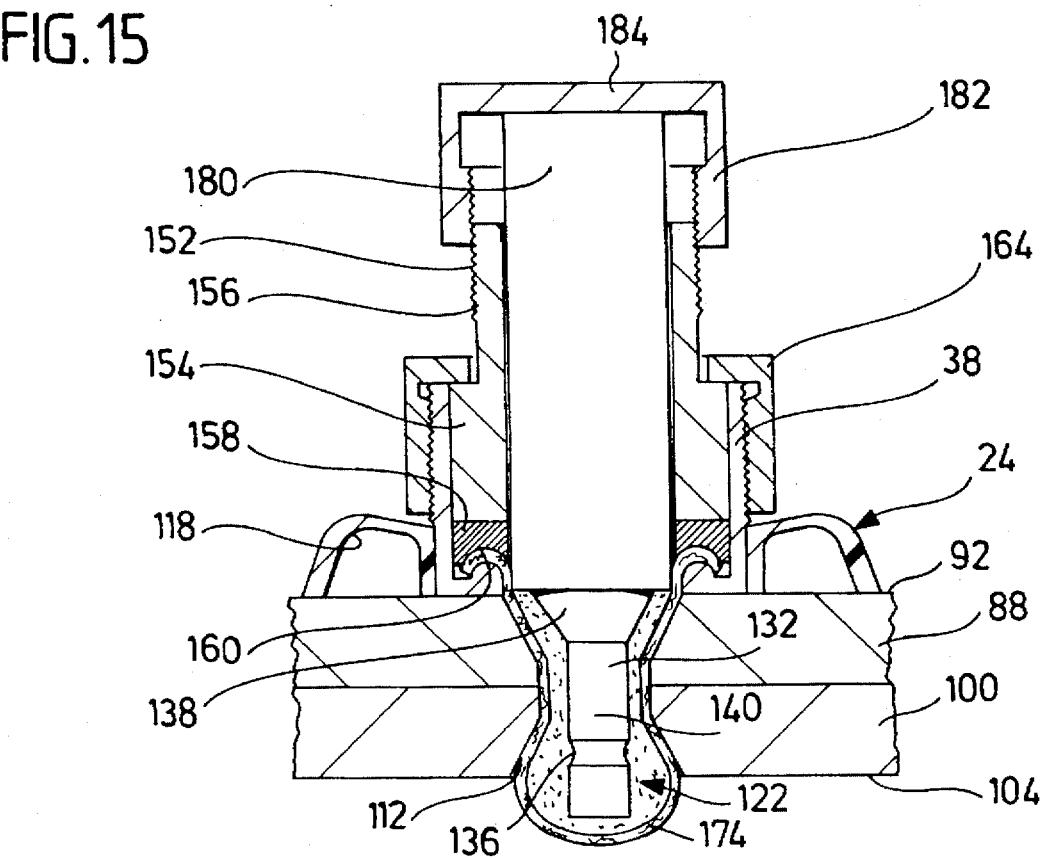
FIG. 15 shows a sectional side view of the second embodiment of the device according to the invention, with a structure part being inserted into the cavity according to an embodiment of the process according to the invention.

As shown in FIG. 15, this structure part 132 may, for example, be in the form of a bolt with a truncated cone shaped bolt head 138 and have a cylindrical bolt shaft 140. In this case, the bolt shaft 140 may be provided with a ring-shaped groove 136 with a semicircular cross-section having undercuts which together with the molding 120 form a positive locking which secures the structure part 132 in its position relative to the molding 120.

Figure 16:
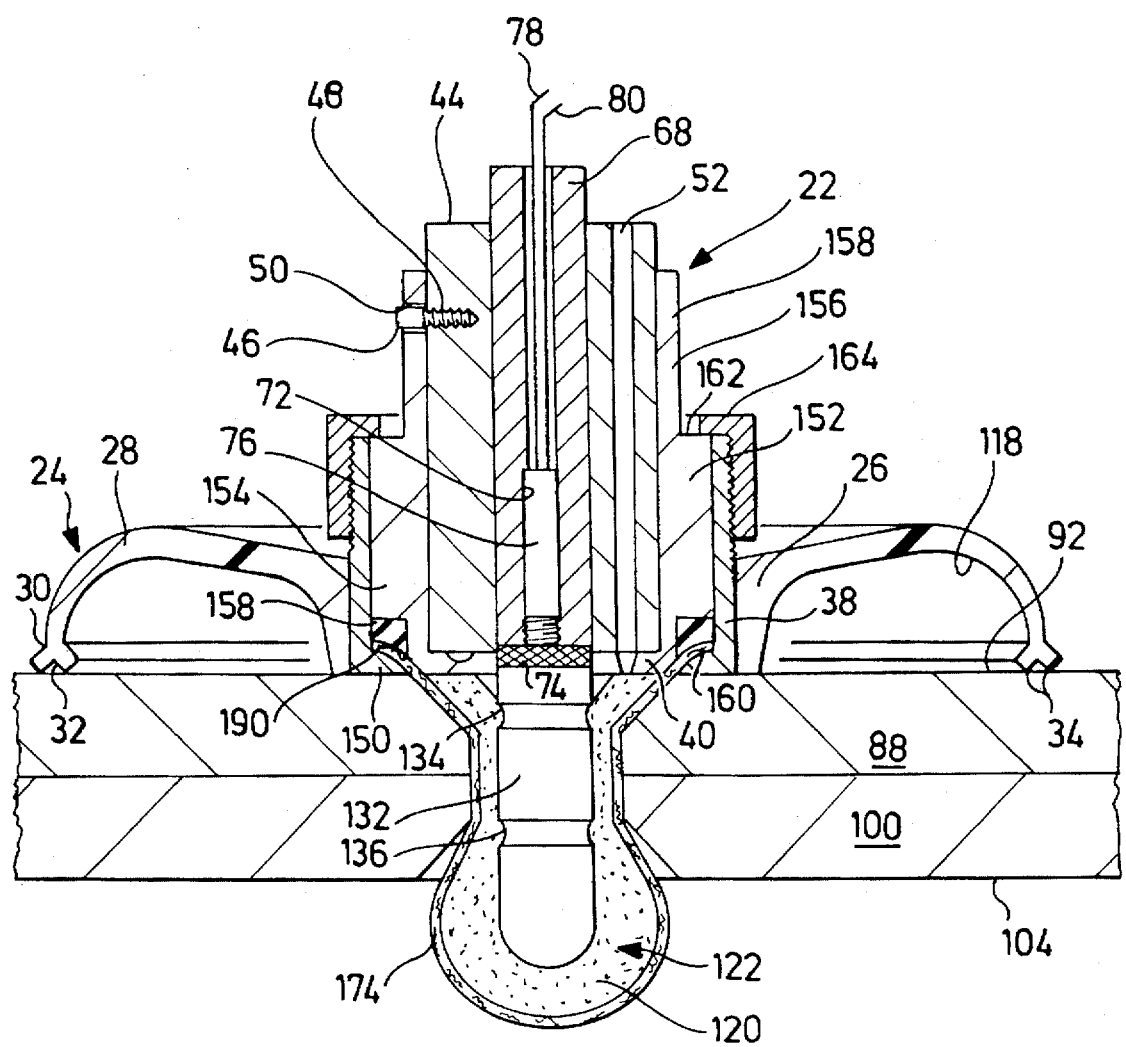
FIG. 16 shows a sectional side view of a third embodiment of the device according to the invention for the production of a joint connection when the cavity is accessible from one or both sides, with a structure part being inserted into the cavity according to an embodiment of the process according to the invention.

Whilst the first embodiment of the device according to the invention shown in FIG. 1 is primarily suitable for the production of joint connections with access from both sides and the second embodiment of the device according to the invention shown in FIG. 10 is primarily suitable for the production of a joint connection where the cavity 112 is accessible from one side, the third embodiment of the device according to the invention shown in FIG. 16 is equally suited to carrying out both processes.

The third embodiment of the device according to the invention given the overall reference 22 comprises a fastening device 24 identical to that described in conjunction with the first embodiment of the device according to the invention.

An outer tube 38 is disposed in the holding tube 26 concentrically thereto and connected non-positively to the holding tube 26. On its lower end, the outer tube 38 has a radially inward protruding, first ring-shaped clamping jaw 150 with a cross-section in the shape of a quarter circle.

A tubular locating plunger 152 concentric to this outer tube 38 is arranged therein with slight play. The locating plunger 152 has a lower thick-walled section 154 and an upper thin-walled section 156. The inside diameter of the two sections 154 and 156 correspond to one another.

The locating plunger 152 is provided with a base 40, which is constructed like the base 40 in the first embodiment of the device according to the invention.

On a lower outer edge, the thick-walled section 154 of the locating plunger 152 has a ring-shaped recess 190 with a rectangular cross-section, in which a second ring-shaped clamping jaw 158 with a rectangular cross-section is disposed. On its underside, the second clamping jaw 158 has a ring-shaped clamping groove 160 with a cross-section in the shape of a quarter circle, the surface of which runs parallel to the surface of the first clamping jaw 150. The clamping groove 160 thus abuts against the first clamping jaw 150 in a lower stop position of the locating plunger 152.

In an upper stop position of the locating plunger 152, a step 162 on the outer side of the locating plunger 152, on which the thick-walled section 154 of the locating plunger 152 merges into the thin-walled section 156, abuts against an underside of an inner edge of a retaining nut 164 screwed onto an external thread on an upper end of the outer tube 38.

An inner tube 44 identical to inner tube 44 in the first embodiment is disposed in the locating plunger 152, and its gate 52, ventilation duct 54 and sluices 56 and 58 are arranged in relation to the feed hole 60, ventilation hole 62 and connection grooves 64 and 66 in the same manner as has been described in conjunction with FIGS. 1 to 3. Like the inner tube 44 in the first embodiment of the device according to the invention, the inner tube 44 of the third embodiment is rotatable in the locating plunger 152 in the outer tube 38, i.e. is guided between two stop positions of a stop pin 46, which is threaded into a radial threaded blind hole 48 of the inner tube 44 and in a horizontally extending elongated hole 50 of the locating plunger 152. In addition, a cylindrical plunger 68 identical to the cylindrical plunger 68 described above is also mounted to slide in the inner tube 44 in this third embodiment.

Since this third embodiment of the device according to the invention comprises a gate 52 and a ventilation duct 54, it may be used in conjunction with a dolly 82 to carry out the above-described process according to the invention for the production of a joint connection where the cavity 112 is accessible from both sides.

Moreover, since this embodiment also comprises a locating plunger 152 with a clamping jaw 150 and a clamping groove 160 as well as a cylindrical plunger 68, which may be used as a plunger, it can additionally be used to carry out the above-described process according to the invention for the production of a joint connection where the cavity 112 is accessible from only one side.

FIG. 16 shows the third embodiment of the device according to the invention with a structure part 132 being pressed into a fabric sack 174 filled with moldable and curable material, which corresponds to the process step shown in FIG. 15 using the second embodiment of the device according to the invention.

The structure part 132 shown in FIG. 16 is in the form of a cylindrical bolt with a rounded lower end. The structure part 132 additionally has two ring-shaped grooves 134 and 136 each with a semicircular cross-section.

Figure 17:
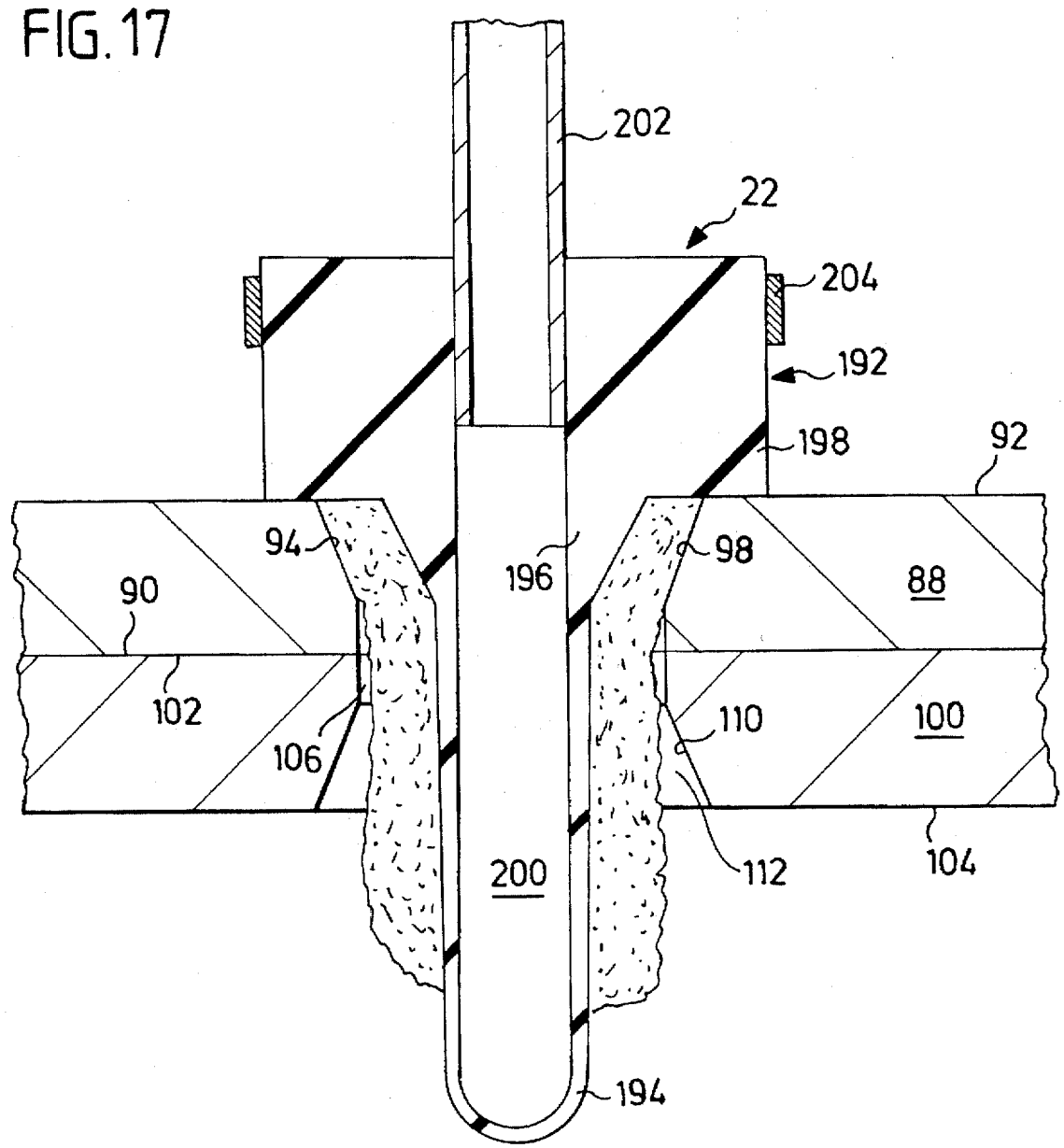
FIG. 17 shows a sectional side view of a fourth embodiment of the device according to the invention for the production of a joint connection when the cavity is accessible from one side, with a positive-locking element having a continuous hole, with a moldable and curable material being inserted into the cavity according to an embodiment of the process according to the invention.
Figure 18:
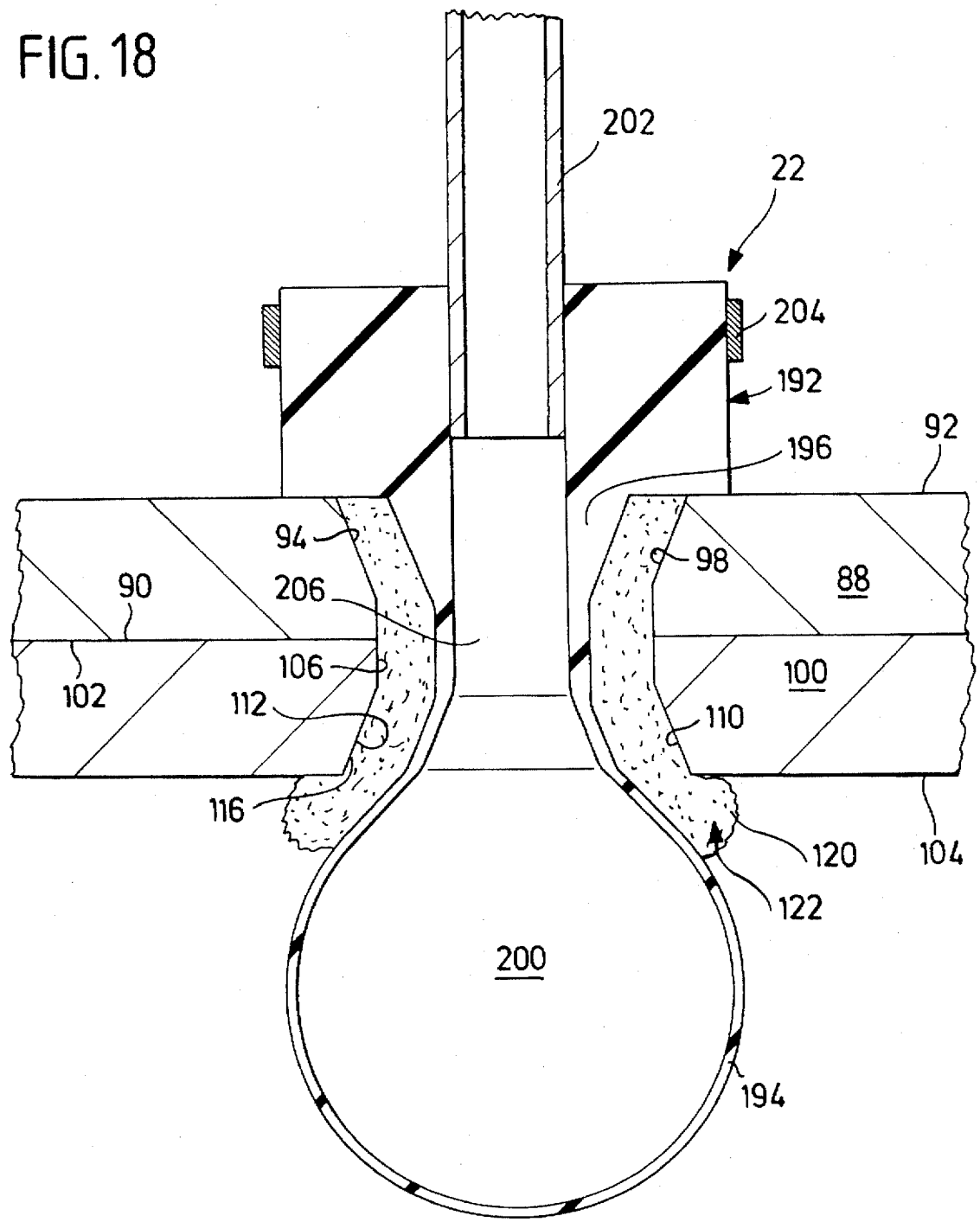
FIG. 18 shows a sectional side view of the fourth embodiment of the device according to the invention, with the moldable and curable material being shaped into a positive-locking element according to an embodiment of the process according to the invention.

FIGS. 17 and 18 show a fourth embodiment of a device according to the invention suitable for the production of joint connections according to the invention with a positive-locking element 122 provided with a continuous hole where the cavity 112 is accessible from only one side.

The fourth embodiment of the device according to the invention given the overall reference 22 comprises a flexible bar 192, which has an elastic hose 194, e.g. made of a latex material, closed on one side, a truncated cone shaped collar 196 molded onto the open end of the hose 194 and a cylindrical stop piece 198 molded onto a side of the collar 196 facing away from the hose 194.

The collar 196 and the stop piece 198 each have central continuous holes, which are concentric to one another and to the hose 194, their diameters corresponding to the inside diameter of the hose 194, and which together with the interior of the hose 194 closed on one side form an inner area 200, which opens to the outside on a face of the cylindrical stop piece 198 facing away from the hose 194.

A hose nozzle 202, which is connected non-positively to the flexible bar 192 by means of a clamp 204 disposed on the periphery of the stop piece 198, is inserted into this aperture. A hose connected to a pressure vessel via a valve is disposed at another end (not shown) of the hose nozzle 202.

The joining pieces 88 and 100 to be joined to one another, as well as their joining position, are identical to those described in conjunction with FIG. 1.

For the production of the joint connection according to the invention, the collar 196 and the elastic hose 194 of the flexible bar 192 are provided with a moldable and curable material on a length corresponding to at least the extension of the cavity 112 perpendicular to the contact surfaces 90, 102.

A fiber-woven fabric may also be inserted into this moldable and curable material.

The device 22 is now inserted from above with the closed end of the elastic hose 194 first into cavity 112 until a lower face of the cylindrical stop piece 198 abuts against surface 92 of the first joining piece 88.

The valve connecting the inner area 200 to the pressure vessel is then opened, causing the flexible bar 192 to be subjected to a high internal pressure.

As a result, the elastic hose 194 expands in a balloon-like manner so that the moldable and curable material arranged on the surface of the elastic hose 194 is pressed against the boundary walls of the cavity 112, as shown in FIG. 18.

It is beneficial if, in its balloon-like expanded state, the elastic hose 194 protrudes downwards over the cavity 112 and has a larger diameter than the lower aperture 116 of the cavity 112, since this prevents the moldable and curable material from being pressed out of the cavity 112.

After curing, the moldable and curable material forms a molding 120 which constitutes a positive-locking element 122 with a continuous hole 206 which, together with the first joining piece 88 and the second joining piece 100, forms a positive locking which secures the two joining pieces 88, 100 relative to one another in directions of stress parallel to the contact surfaces 90 and 102.

In addition, the areas of the positive-locking element 122 abutting against the truncated cone shaped sections 98, 110 of the passages 94, 106 constitute undercuts which, together with the first joining piece 88 and the second joining piece 100, form a positive locking which secures the positive-locking element 122 in the cavity 112.

After curing, the pressure in the inner area 200 of the flexible bar 192 is reduced, whereupon the balloon-like expansion of the hose 194 decreases and the flexible bar 192 can be removed upwards through the continuous hole 206 present in the positive-locking element 122.

Figure 19:
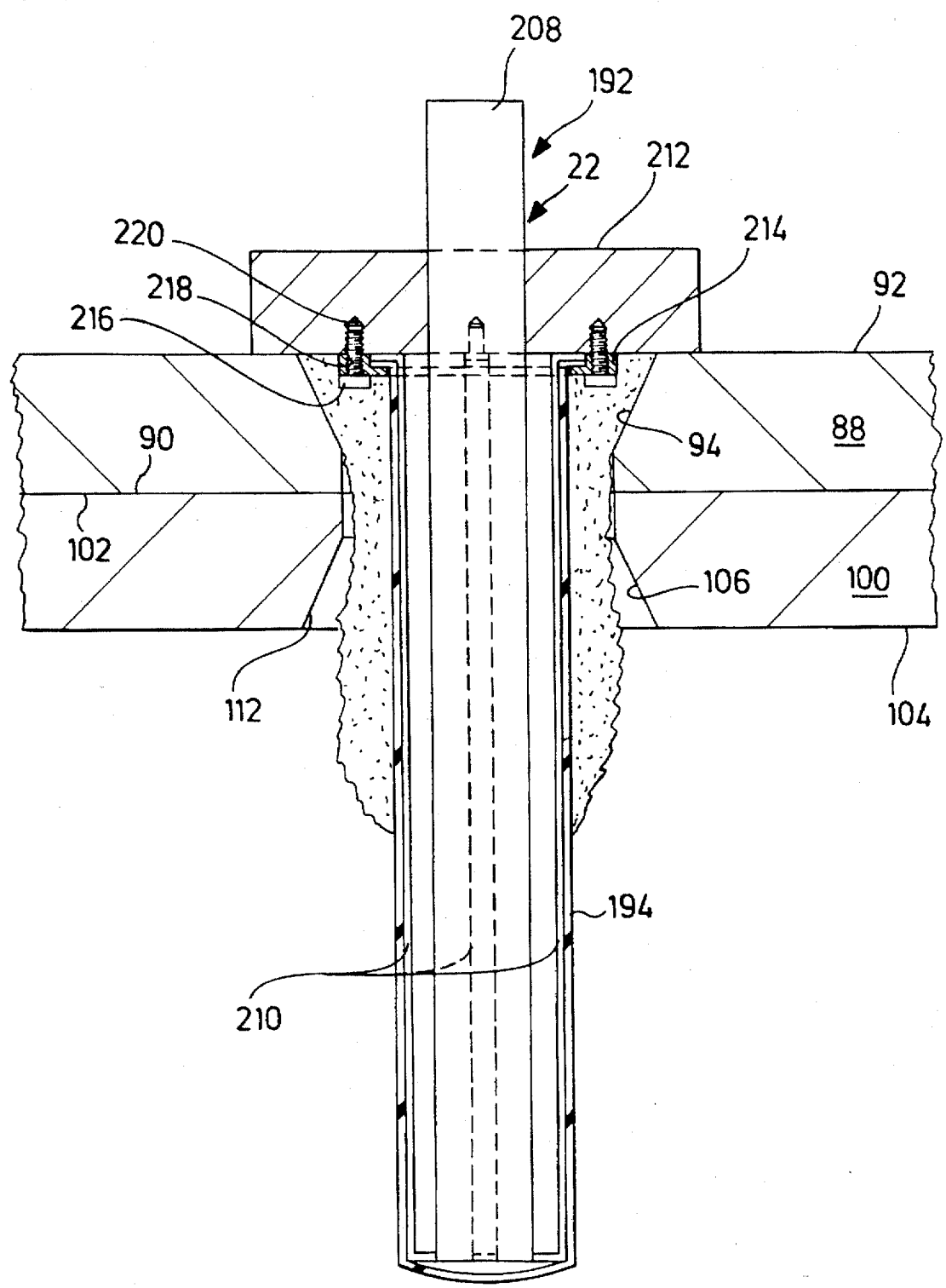
FIG. 19 shows a sectional side view of a fifth embodiment of the device according to the invention for the production of a joint connection when the cavity is accessible from one side, with a positive-locking element having a continuous hole and with a moldable and curable material being inserted into the cavity according to an embodiment of the process according to the invention.

FIGS. 19 and 20 show a fifth embodiment of the device according to the invention, which is also suitable for the production of joint connections according to the invention with a positive-locking element 122 provided with a continuous hole 206 where the cavity 112 is only accessible from one side.

The fourth embodiment of the device according to the invention given the overall reference 22 comprises a bar 192 which has a round rod 208, at one end of which several bendable lamella 210 are linked. The lamella 210 are also linked to a face of a cylindrical running sleeve 212. The running sleeve 212 is mounted on the round rod 208 with slight play.

The lamella 210 and the round rod 208 are disposed in an elastic hose 194 made of a rubber-like material, for example, which closely abuts against the lamella 210 and is closed at one end.

An edge of the hose 194 surrounding an opening in the elastic hose 194 is firmly clamped on the face of the running sleeve 212 facing the lamella 210 by means of a clamping ring 214. The clamping ring 214 is in turn held by several locking screws 216 distributed along its periphery, which pass through continuous holes 218 arranged in the clamping ring and are threaded into axial blind threaded holes 220 in the running sleeve 212.

The joining pieces 88 and 100, as well as their joining position, are identical to those explained in conjunction with FIG. 1.

To produce the joint connection according to the invention, the round rod 208 is moved relative to the running sleeve 212 until the lamella 210 are bent to a minimum degree.

The elastic hose 194 is then provided with a moldable and curable material on a length corresponding to at least the extension of the cavity 112 perpendicular to the contact surfaces 90, 102.

The bar 192 is then inserted from above with the elastic hose 194 first into the cavity 112 until a face of the running sleeve 212 facing the elastic hose 194 abuts against the upper side 92 of the first joining piece 88.

The round rod 208 is then pulled upwards, while the running sleeve 212 is secured on the first joining piece 88 by a contact pressure. Since in this way a section of each of the lamella 210 linked to the round rod 208 moves towards a section of each of the lamella 210 linked to the running sleeve 212, the lamella 210 are forced to bend outwards, and as a result the elastic hose 194 expands like a balloon, as shown in FIG. 20, and the moldable and curable material disposed on the surface of the elastic hose 194 is pressed against the boundary walls of the cavity 112.

It is beneficial if, in its balloon-like expanded state, the elastic hose 194 protrudes downwards over the cavity 112 and has a larger diameter than the lower aperture 116 of the cavity 112, since this prevents the moldable and curable material from being pressed out of the cavity 112.

This position of the round rod 208 is maintained until the moldable and curable material has cured. Hence, as a result of the curing a molding 120 is formed which constitutes a positive-locking element 122 with a continuous hole 206 which, together with the first joining piece 88 and the second joining piece 100, forms a positive locking which secures the two joining pieces 88 and 100 relative to one another in directions of stress parallel to the contact surfaces 90 and 102.

Additionally, the areas of the positive-locking element 122 abutting against the boundary walls of the truncated cone shaped sections 98, 110 of the passages 94, 106 constitute undercuts which, together with the joining pieces 88 and 100, form a positive locking which secures the positive-locking element 122 in the cavity 112.

After curing, the round rod 208 is moved back into its initial position again, and as a result the bending of the lamella 210 and the balloon-like expansion of the elastic hose 194 are reduced so that the device 22 can be removed through the continuous hole 206 present in the positive-locking element 122.

The fourth and fifth embodiments of the device according to the invention may also be used prior to production of the joint connection according to the invention without being provided with a moldable and curable material to provisionally join and position joining pieces 88 and 100 relative to one another.

It is possible in this case to compensate irregularities in the joining pieces 88, 100 prior to production of the joint connection with the same moldable and curable material as is also used in the production of the joint connection according to the invention. This is particularly advantageous when joining ceramic fiber joining pieces, since such joining pieces are not guaranteed to retain their shape during production.

What is claimed is:

1. Device for the production of a joint connection between a first joining piece with a first contact surface and a passage opening onto the first contact surface, and a second joining piece with a second contact surface and a recess opening onto the second contact surface, said first joining piece and second joining piece being brought into a joining position in relation to one another, in which the first contact surface and the second contact surface abut one another and the passage of the first joining piece and the recess of the second joining piece together form a cavity, said device comprising:

a cover for closing off a first end of the cavity;

said cover having a feed aperture and a ventilation aperture;

a gate for feeding a moldable and curable material into the cavity via said feed aperture;

a ventilation duct for discharging air from the cavity via said ventilation aperture which has been displaced by the moldable and curable material;

at least one sluice which is adapted to carry a flushing rinsing medium; and at least one connection groove which is adapted to fluidly connect said at least one sluice to at least one of said gate and said ventilation duct to allow flushing thereof.

2. Device according to claim 1, further comprising:

a body which carries said gate and ventilation duct; and a fastener for securing the body on at least one of the joining pieces.

3. Device according to claim 2, wherein:

the fastener comprises a suction chamber for sealing said body to an upper surface of said first joining piece.

4. Device according to claim 1, further comprising:

a heating device for heating the moldable and curable material in said cavity.

5. Device according to claim 2, wherein:

said body extends away from said first end of said cavity and defines a continuous hole;

said gate and ventilation duct extend through said body; and a plunger is disposed in said continuous hole for inserting a structure part into the cavity.

6. Device according to claim 1, further comprising:

an outer tube having said cover as a base and extending away from said first end of said cavity;

an inner tube which is concentric to, and disposed within, said outer tube and rotatable with respect to an axis of rotation of said outer tube;

said gate, ventilation duct, and said at least one sluice extend independently from one another through said inner tube; wherein:

when said inner tube is rotated to a first position with respect to said outer tube, said gate is aligned with said feed aperture to allow said feeding of said moldable and curable material into the cavity, and said ventilation duct is aligned with said ventilation aperture to allow said discharging of air from the cavity; and when said inner tube is rotated to a second position with respect to said outer tube which is different than said first position, said at least one connection groove fluidly connects said at least one sluice to said at least one of said gate and said ventilation duct.

7. Device according to claim 6, wherein:

first and second sluices, and first and second connecting grooves are provided;

said first and second sluices extending independently from one another through said inner tube; and when said inner tube is rotated to said second position, said first connection groove is adapted to fluidly connect said first sluice and said gate, and said second connection groove is adapted to fluidly connect said second sluice and said ventilation duct.

8. Device according to claim 6, wherein:

wherein said at least one connection groove extends about said axis of rotation in an arc.

9. Device according to claim 6, wherein:

wherein said at least one connection groove is provided in said cover.

10. Device according to claim 4, further comprising:

a body which extends away from said cover and defines a continuous hole;

said gate and ventilation duct extend through said body; wherein:

said heating device is disposed in said continuous hole and is adapted to transfer heat to said cavity via said cover.

11. Device according to claim 10, wherein:

said body comprises:

an outer tube having said cover as a base and extending away from said cavity;

an inner tube which is concentric to, and disposed within, said outer tube;

said gate, ventilation duct, and said at least one sluice extending independently from one another through said inner tube;

said cover comprising a plug which is a terminus of said continuous hole;

said heating device being adapted to transfer heat to said cavity via said plug.

12. Device according to claim 11, wherein:

said plug is made of a material with a high thermal conductivity.

* * * * *